United States Patent
Kim et al.

(10) Patent No.: US 10,066,377 B2
(45) Date of Patent: Sep. 4, 2018

(54) FOOD WASTE TREATMENT APPARATUS

(71) Applicant: LG ELECTRONICS INC., Seoul (KR)

(72) Inventors: Jongseok Kim, Seoul (KR); Daeyun Park, Seoul (KR); Jeongyun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 502 days.

(21) Appl. No.: 14/796,018

(22) Filed: Jul. 10, 2015

(65) Prior Publication Data

US 2016/0017581 A1 Jan. 21, 2016

(30) Foreign Application Priority Data

Jul. 16, 2014 (KR) .................. 10-2014-0090068

(51) Int. Cl.
*E03C 1/266* (2006.01)
*B02C 23/10* (2006.01)
(Continued)

(52) U.S. Cl.
CPC ........ *E03C 1/2665* (2013.01); *B02C 18/0092* (2013.01); *B02C 18/2216* (2013.01);
(Continued)

(58) Field of Classification Search
CPC . B02C 18/0092; B02C 18/2216; B02C 23/10; B02C 23/20; B09B 3/00; F26B 5/08
(Continued)

(56) References Cited

U.S. PATENT DOCUMENTS

| 5,622,617 | A | 4/1997 | Tsusaka |
| 2002/0096459 | A1 | 7/2002 | Suzuki |

(Continued)

FOREIGN PATENT DOCUMENTS

| CN | 1129148 | 8/1996 |
| CN | 201045201 | 4/2008 |

(Continued)

OTHER PUBLICATIONS

Chinese Office Action in Chinese Application No. 2015-10387418, dated Jan. 11, 2017, 13 pages (with English translation).

(Continued)

*Primary Examiner* — Omar Flores Sanchez
(74) *Attorney, Agent, or Firm* — Fish & Richardson P.C.

(57) ABSTRACT

A food waste treatment apparatus includes a housing that defines a space that is configured to dehydrate and dry food waste, the housing having an inlet port that is configured to receive the food waste and an outlet port that is configured to discharge the food waste that has been dehydrated and dried. The apparatus includes a cylindrical dehydrator that is configured to remove water included in the food waste by spinning the food waste inside the housing, the cylindrical dehydrator having a communication hole that is configured to connect with the inlet port or the outlet port based on rotation of the cylindrical dehydrator. The apparatus includes an agitator that is located in the cylindrical dehydrator that is configured to rotate simultaneously with or independently of the dehydrator. The apparatus includes a dryer that is configured to dry the food waste by supplying dry air to the housing.

20 Claims, 23 Drawing Sheets

(51) Int. Cl.
*B09B 3/00* (2006.01)
*F26B 5/08* (2006.01)
*B02C 18/00* (2006.01)
*B02C 18/22* (2006.01)
*B02C 23/20* (2006.01)

(52) U.S. Cl.
CPC .............. *B02C 23/10* (2013.01); *B02C 23/20* (2013.01); *B09B 3/00* (2013.01); *F26B 5/08* (2013.01)

(58) Field of Classification Search
USPC .............................. 241/46.013, 46.014, 46.17
See application file for complete search history.

(56) References Cited

U.S. PATENT DOCUMENTS

| | | | |
|---|---|---|---|
| 2006/0076440 A1* | 4/2006 | Kim ........................ | B02C 19/22 241/65 |
| 2010/0133370 A1* | 6/2010 | Flynn .................. | B02C 18/0092 241/46.01 |
| 2013/0217111 A1* | 8/2013 | Chang .................... | C12M 27/06 435/290.1 |
| 2015/0231639 A1* | 8/2015 | Kim .................... | B02C 18/0092 241/60 |
| 2016/0200616 A1* | 7/2016 | Platts ...................... | C02F 11/16 210/113 |

FOREIGN PATENT DOCUMENTS

| | | |
|---|---|---|
| JP | H06-343944 | 12/1994 |
| JP | H10-109046 | 4/1998 |
| JP | 2001-025754 | 1/2001 |
| JP | 2001-187374 | 7/2001 |
| JP | 2002-011446 | 1/2002 |
| JP | 2004-141791 | 5/2004 |
| JP | 2005-021734 A | 1/2005 |
| KR | 10-2008-0113686 A | 12/2008 |
| KR | 10-2014-0036486 A | 3/2014 |
| KZ | 18441 | 5/2007 |
| RU | 2414957 | 3/2011 |
| WO | 2010/039165 | 4/2010 |

OTHER PUBLICATIONS

Notice of Allowance issued in Russian Application No. 2015123943 dated Sep. 1, 2016, 15 pages (with English translation).
European Search Report dated Oct. 27, 2015 for European Application No. 15176819.9, 6 pages.

\* cited by examiner

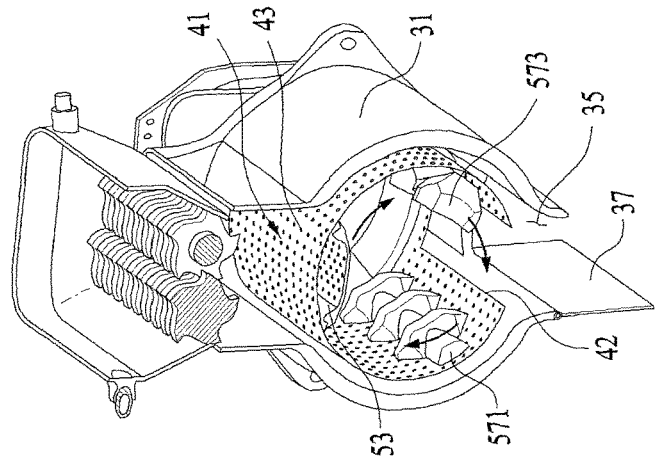
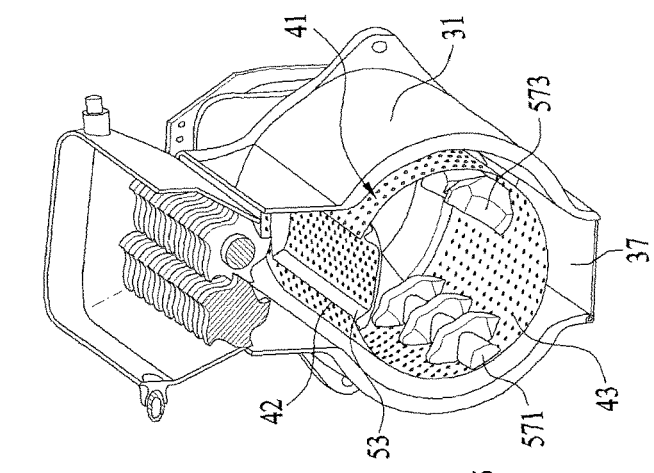
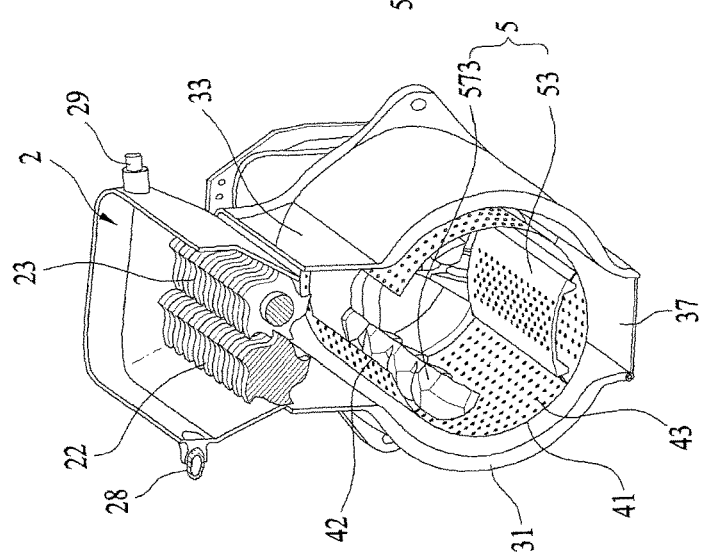

FOOD WASTE TREATMENT APPARATUS

CROSS REFERENCE TO RELATED APPLICATION

This application claims the benefit of Korean Patent Application No. 10-2014-0090068, filed on Jul. 16, 2014 which is hereby incorporated by reference as if fully set forth herein.

FIELD

The present disclosure relates to a food waste treatment apparatus.

BACKGROUND

Among methods to treat food waste generated in a kitchen, there is a method in which a drain in a sink is equipped with a garbage disposal unit to allow food waste discharged from the drain to be shredded prior to passing through plumbing.

The conventional garbage disposal unit as described above is configured to grind food waste introduced, along with water, through the sink's drain into small pieces using grinding blades thereof. The ground food waste may be discharged separately, or may pass through plumbing along with waste water.

Conventional garbage disposal units are adapted to grind food waste via a simplified grinding operation using the same structure of grinding blades regardless of the kinds of introduced food waste. That is, the food waste is ground and discharged via the same grinding process regardless of the viscosity, strength, and size of food waste to be disposed of.

SUMMARY

According to an innovative aspect of the subject matter described in this specification, a food waste treatment apparatus includes a housing that defines a space that is configured to dehydrate and dry food waste, the housing having an inlet port that is configured to receive the food waste and an outlet port that is configured to discharge the food waste that has been dehydrated and dried; a cylindrical dehydrator that is configured to remove water included in the food waste by spinning the food waste inside the housing, the cylindrical dehydrator having a communication hole that is configured to connect with the inlet port or the outlet port based on rotation of the cylindrical dehydrator; an agitator that is located in the cylindrical dehydrator, that is configured to rotate simultaneously with or independently of the dehydrator, that is configured to selectively open or close the communication hole, and that is configured to agitate and grind the food waste inside the cylindrical dehydrator based on rotation of the agitator; and a dryer that is configured to dry the food waste by supplying dry air to the housing.

The food waste treatment apparatus may include one or more of the following optional features. The food waste treatment apparatus includes a drive unit that is configured to rotate the agitator in a clockwise direction and a counterclockwise direction. The cylindrical dehydrator rotates along with the agitator based on the agitator being rotated in one direction among the clockwise direction and the counterclockwise direction. The agitator includes a base that is located inside the cylindrical dehydrator and is configured to rotate; a door blade extending from an outer circumferential surface of the base along the inside of the dehydrator, the door blade being configured to selectively open or close the communication hole and to agitate and grind the food waste inside a storage body of the cylindrical dehydrator based on rotation of the base; and an agitation blade that is spaced apart from the door blade by a predetermined distance, that extends along the inside of the storage body, and that is configured to agitate and grind the food waste in the storage body based on rotation of the base. The door blade includes a connection bar that radially extends from the outer circumferential surface of the base; and a door that is located at an end of the connection bar at a position corresponding to the communication hole and that has a predetermined length.

The connection bar includes a rear scraper that is located on an outer surface of the connection bar and that is configured to contact a rear inner surface of the cylindrical dehydrator. The door includes a plurality of inward cutters that are located at a lower surface of the door and are configured to grind the food waste located in a central region of the cylindrical dehydrator. The door includes circumferential scrapers that are located at both longitudinal ends of the door and are configured to contract an inner circumferential surface of the cylindrical dehydrator. The door includes axial scrapers that are located at both transverse ends of the door, that are configured to contact an inner circumferential surface of the cylindrical dehydrator, and that are configured to maintain air-tightness of the cylindrical dehydrator based on the door covering the communication hole. The cylindrical dehydrator includes a plurality of fixed cutters that are located at inner circumferential surface of the cylindrical dehydrator. The door defines a cutter recess that is located at an end of the door and configured to intersect the fixed cutters.

The agitation blade includes a connection bar that radially extends from the outer circumferential surface of the base; and a spacer cutter blade that extends from an end of the connection bar and is separated from an inner circumferential surface of the cylindrical dehydrator by a predetermined distance. The spacer cutter blade includes a plurality of outward cutters that are located at an outer surface of the spacer cutter blade and that are configured to grind the food waste located on the inner circumferential surface of the cylindrical dehydrator. The agitation blade includes a connection bar that radially extends from the outer circumferential surface of the base; and a scraping blade that extends from an end of the connection bar and that is located in proximity to the inner circumferential surface of the cylindrical dehydrator. The scraping blade is a curved bar that protrudes in a rotation direction of the base and is located in proximity to an inner side surface of the cylindrical dehydrator.

The scraping blade is configured to move the food waste forward along the cylindrical dehydrator based on the agitator rotating in a first rotation direction and configured to move the food waste rearward along the cylindrical dehydrator based on the agitator rotating in a second rotation direction that is opposite the first rotation direction. The scraping blade has a downwardly inclined cross section relative to a first rotation direction of the base and is located in proximity to an inner side surface of the cylindrical dehydrator. The scraping blade is located in proximity to an inner side surface of the cylindrical dehydrator and has a longitudinal edge in proximity to the inner circumferential surface of the cylindrical dehydrator and an opposite longitudinal edge separated from the inner circumferential surface of the cylindrical dehydrator. The scraping blade is configured to press and grind the food waste based on the agitator rotating in a first rotation direction and the scraping blade is configured to scrape and separate the food waste from the inner circumferential surface of the cylindrical dehydrator based on the agitator rotating in a second rotation direction that is opposite the first rotation direction.

The agitation blade includes a first connection bar that radially extends from the outer circumferential surface of the base; a first oblique blade that extends from an end of the first connection bar, that is located in proximity to an inner circumferential surface of the cylindrical dehydrator, and that is inclined toward a first rotation direction of the base; a second connection bar that radially extends from the outer circumferential surface of the base and that is separated from the first connection bar; and a second oblique blade that extends from an end of the second connection bar, that is located in proximity to the inner circumferential surface of the cylindrical dehydrator, and that is inclined toward a second rotation direction of the base that is opposite the first rotation direction. The first oblique blade includes a plurality of first cutter recesses that are each separated by a predetermined distance. The second oblique blade includes a plurality of second cutter recesses that are each separated from the respective first cutter recesses. Each depth of each first cutter recess and each second cutter recess are different depths.

Accordingly, the subject matter described in this application is directed to a food waste treatment apparatus that substantially obviates one or more problems due to limitations and disadvantages of the related art.

One object of the subject matter described in this application is to provide a food waste treatment apparatus which is capable of grinding, dehydrating and drying food waste.

In addition, another object of the subject matter described in this application is to provide a food waste treatment apparatus which is capable of achieving uniform grinding effects regardless of the kinds of food waste when various kinds of food waste are introduced.

In addition, a further object of the subject matter described in this application is to provide a food waste treatment apparatus which includes a rotating shaft intersecting a food introduction direction.

BRIEF DESCRIPTION OF THE DRAWINGS

FIGS. 8(a), 8(b), and 8(c) are views of an example operating process of a dehydrator of a food waste treatment apparatus.

DETAILED DESCRIPTION

Figure 1:
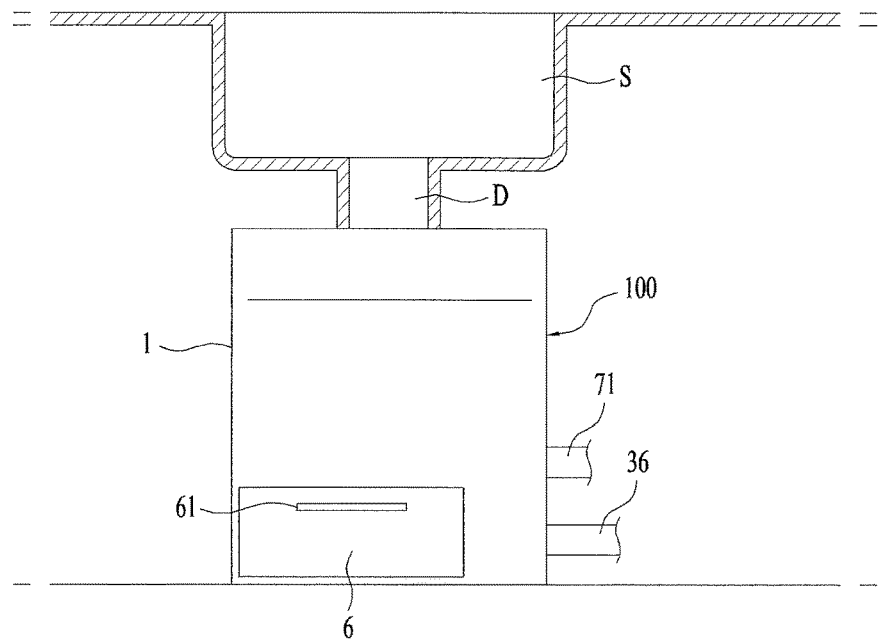
FIG. 1 is a schematic view of an example installation state of a food waste treatment apparatus.
Figure 2:
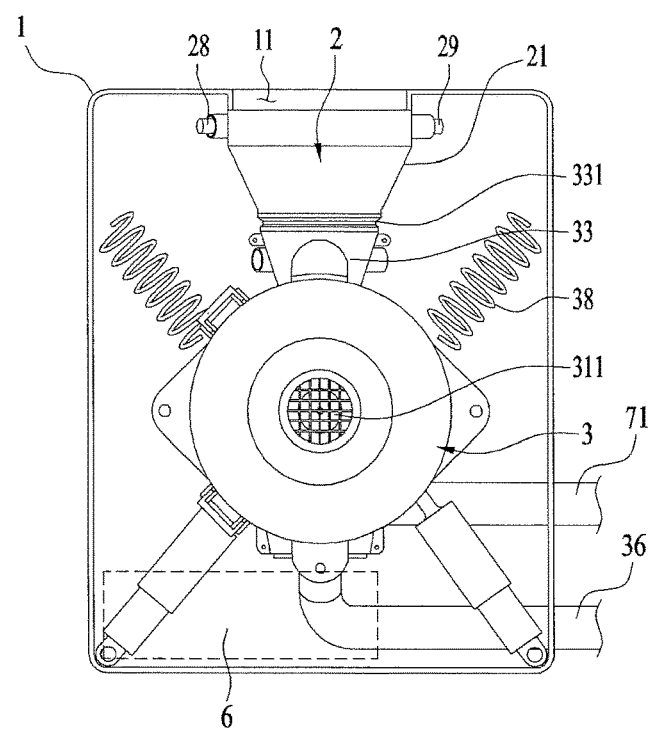
FIG. 2 is a front view of an example food waste treatment apparatus.
Figure 3:
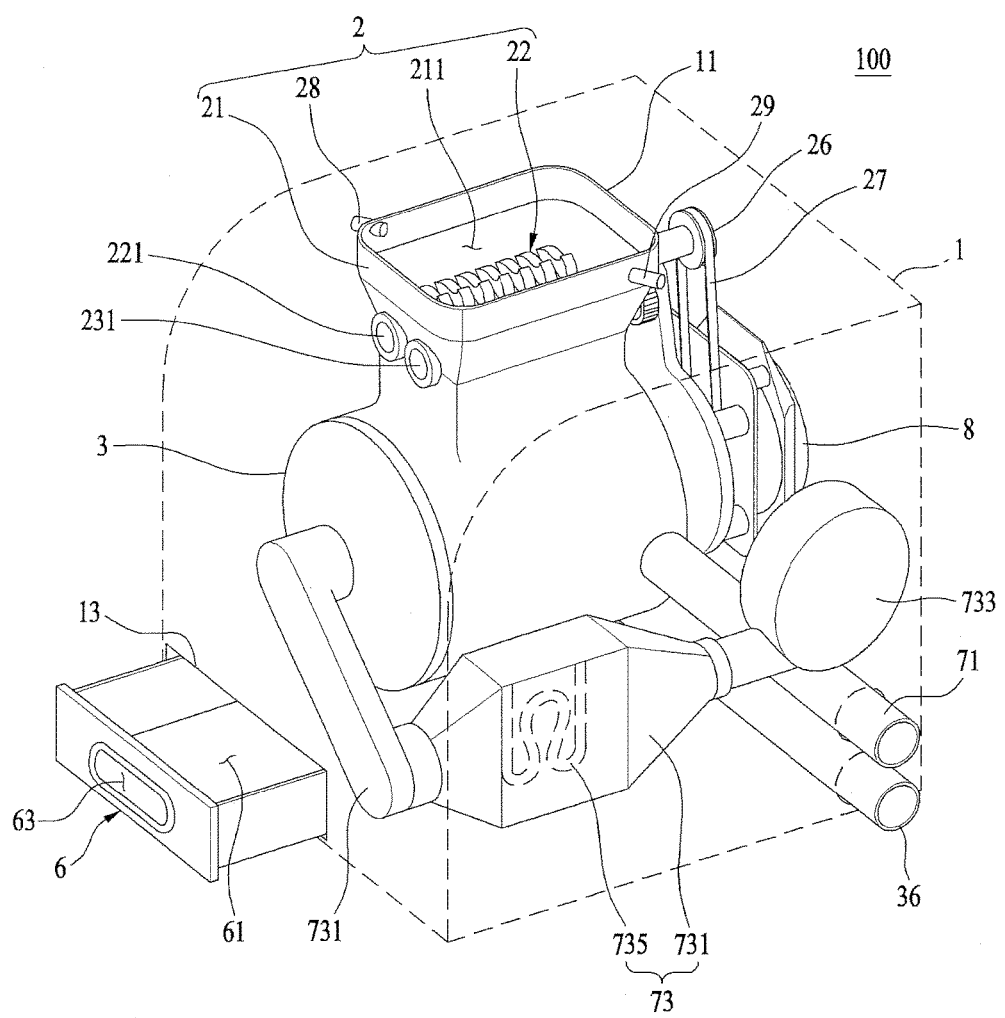
FIG. 3 is a perspective view of an example food waste treatment apparatus.

FIG. 1 illustrates an example installation state of a food waste treatment apparatus. FIG. 2 illustrates an example food waste treatment apparatus. FIG. 3 illustrates an example food waste treatment apparatus.

The food waste treatment apparatus 100 may be separably mounted to a drain D in a sink S. In some implementations, the food waste treatment apparatus 100 may be an independent apparatus that is separated from the sink S and configured to grind, dehydrate, and dry food waste introduced thereto by a user. For convenience of description, the following description is based on the food waste treatment apparatus 100 that is separably mounted to the sink S.

As illustrated in FIGS. 1 and 2, the food waste treatment apparatus 100 includes a cabinet 1 separably mounted to the drain D through a connection region 11, a grinder 2 installed in the cabinet 1 to grind food waste supplied from the drain D, a housing 3 into which the food waste, ground in the grinder 2, is introduced, and a dehydrator 4 rotatably installed in the housing 3 to provide a space for storage of the food waste and a space for treatment, e.g., washing, grinding, dehydration, or drying, of the food waste.

Here, a drawer 6 may be installed in the cabinet 1 at a position below the housing 3 such that the food waste discharged from the housing 3 is stored in the drawer 6. The drawer 6, as illustrated in FIGS. 2 and 3, may include a drawer body 61 that is located below the housing 3 and provides a space in which the ground food waste is stored, and a handle 63 to assist the user in easily retracting the drawer body 61. In some implementations, the drawer body 61 may be retracted from the cabinet 1 through an opening 13 formed in the cabinet 1.

Meanwhile, the grinder 2 includes a support body 21 to guide the food waste, supplied from the connection region 11, to the housing 3, and first and second rotary cutters 22 and 23 arranged in the support body 21 to grind the food waste.

Figure 4:
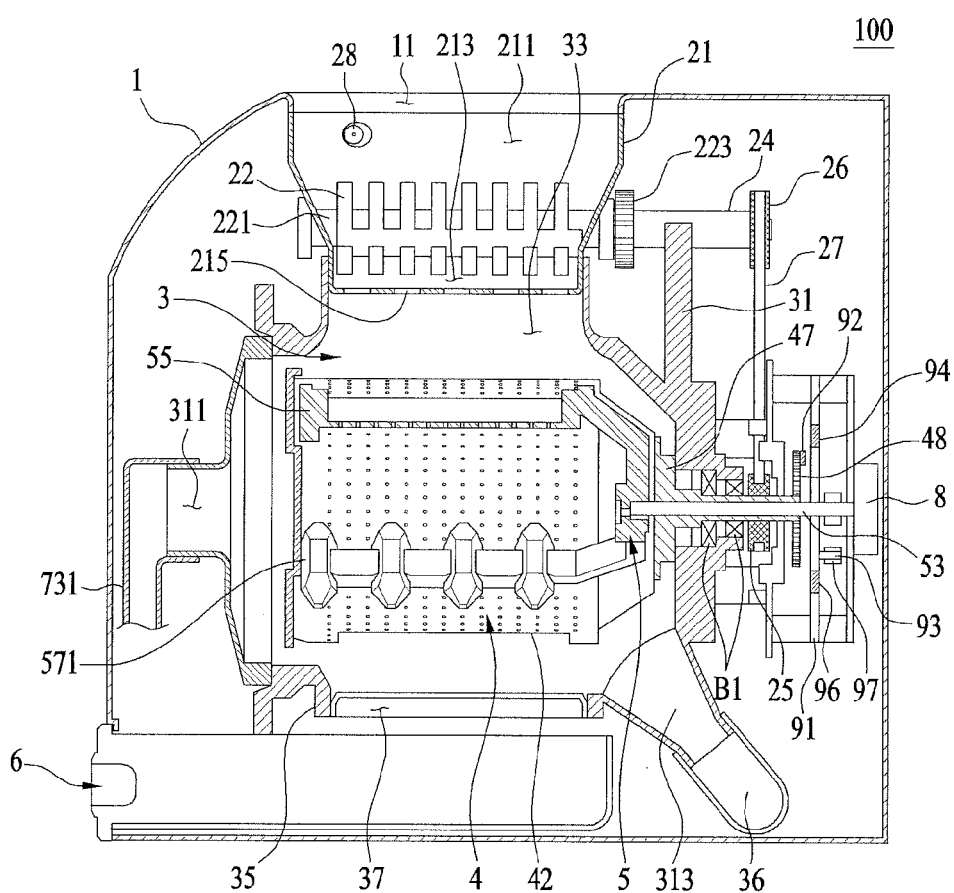
FIG. 4 is a sectional view of an example internal configuration of a food waste treatment apparatus.

As illustrated in FIG. 4, the support body 21 may take the form of a pipe, opposite sides of which are open. That is, the support body 21 may have an introduction side 211 that is in communication with the connection region 11 for supply of the food waste to the first and second rotary cutters 22 and 23 and a discharge side 213 for discharge of the food waste, ground by the first and second rotary cutters 22 and 23, to the housing 3.

The connection region 11 of the cabinet 1 and the introduction side 211 of the support body 21 may be shaped to assure coupling of the drain D in the sink S thereto.

The first and second rotary cutters 22 and 23 are located between the introduction side 211 and the discharge side 213 and adapted to be rotated in opposite directions.

Figure 6:
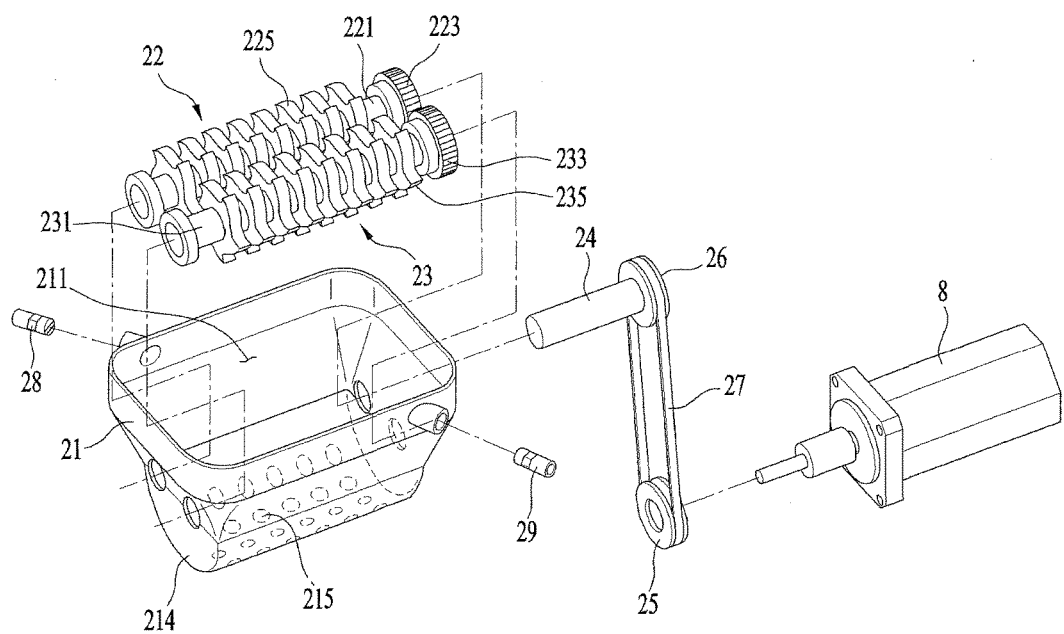
FIG. 6 is an exploded perspective view of an example grinder of a food waste treatment apparatus.

As illustrated in FIG. 6, the first rotary cutter 22 may include a first shaft 221 rotatably installed to the support body 21, a plurality of first cutters 225 coupled to the first shaft 221 so as to be located inside the support body 21, and a first gear 223 secured to the first shaft 221 so as to be located outside the support body 21.

The second rotary cutter 23 may include a second shaft 231 rotatably installed to the support body 21, a plurality of second cutters 235 coupled to the second shaft 231 so as to be located inside the support body 21, and a second gear 233 secured to the second shaft 231 so as to be connected to the first gear 223.

The first cutters 225 may be spaced apart from one another by a predetermined distance in the longitudinal direction of the first shaft 221, and the second cutters 235 may be located respectively in a space defined between a respective one of the first cutters 225 and a neighboring one of the first cutters 225.

The first and second rotary cutters 22 and 23 as described above may be rotated by a drive unit 8 that is used to rotate the dehydrator 4, or may be rotated by a drive unit that is provided separately from the drive unit 8.

In the case where the first and second rotary cutters 22 and 23 are rotated by the drive unit 8, a power transmission mechanism needs to be interposed between the grinder 2 and the drive unit 8. The power transmission mechanism may include a drive shaft 24 connected to the first gear 223, a driven pulley 26 coupled to the drive shaft 24, a driving pulley 25 configured to be rotated by the drive unit 8, and a belt 27 connecting the driving pulley 25 and the driven pulley 26 to each other.

When the drive unit 8 rotates the driving pulley 25, the first gear 223 is rotated by the belt 27 and the driven pulley 26. When the first gear 223 is rotated, the second gear 233 is rotated in an opposite direction of a rotation direction of the first gear 223. Thereby, the food waste, supplied through the introduction side 211, may be ground while passing between the first cutters 225 and the second cutters 235 and then moved to the discharge side 213.

Meanwhile, the food waste treatment apparatus 100 is capable of not only dehydrating the food waste using the dehydrator 4, but also drying the food waste using a dryer 73 that will be described below. The dehydration and drying efficiencies of the food waste may be enhanced by maintaining the particle size of food waste discharged from the grinder 2 at a given size or less.

To maintain the particle size of food waste discharged from the grinder 2 at a given size or less, the discharge side 213 of the support body 21 may be provided with a receiving portion 214 that defines a space in which the first and second rotary cutters 22 and 23 are received. A plurality of discharge holes 215 may be perforated in the receiving portion 214 such that the food waste is discharged from the receiving portion 214 through the discharge holes 215.

At least a portion of the circumference of each first cutter 225 and at least a portion of the circumference of each second cutter 235 are located in the space defined by the receiving portion 214. As such, the food waste, ground by the respective cutters 225 and 235 and introduced into the receiving portion 214, is subjected to grinding by the respective cutters 225 and 235 until it is ground to a sufficient size to pass through the discharge holes 215.

Meanwhile, in the case of food waste that is difficult to be ground or has high viscosity, the food waste ground by the cutters 225 and 235 may remain at cutter surfaces, rather than being separated from the cutters 225 and 235. In this case, foul odors due to decomposition of the food waste may be generated.

Figure 7:
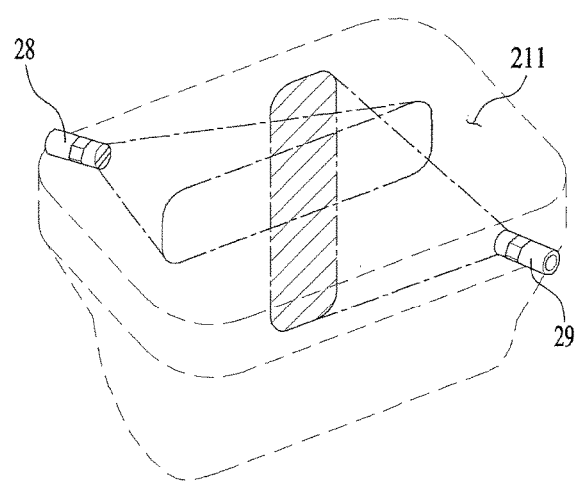
FIG. 7 is a schematic view of an example ejection of wash water in a food waste treatment apparatus.

To solve the problem as described above, the food waste treatment apparatus 100 may further include a wash water ejector to eject water into the support body 21. The wash water ejector may include a first nozzle 28 and a second nozzle 29 which are installed to the support body 21 to eject water supplied from the outside (see FIG. 7).

The first nozzle 28 may be shaped such that an ejection width in the direction parallel to the introduction side 211 is greater than an ejection width in the direction perpendicular to the introduction side 211. The second nozzle 29 may be shaped such that an ejection width in the direction perpendicular to the introduction side 211 is greater than an ejection width in the direction parallel to the introduction side 211. This serves to minimize an area of an inner space of the support body 21 where no water is supplied by differentiating supply areas of water ejected from the first nozzle 28 and the second nozzle 29.

To maximize this effect, the first nozzle 28 and the second nozzle 29 may be secured to the support body 21 so as to face each other and to eject water toward the first and second rotary cutters 22 and 23. In some implementations, an ejection angular range of water supplied from the first nozzle 28 and an ejection angular range of water supplied from the second nozzle 29 may be perpendicular to each other.

As illustrated in FIG. 8, the housing 3 may serve to connect the grinder 2 and the drawer 6 to each other, to provide a space in which the dehydrator 4 is received, and to guide water discharged from the drain D in the sink S to a sewage flow path.

The housing 3 includes a housing body 31 located between the grinder 2 and the drawer 6. The housing body 31 has an inlet port 33 that is in communication with the discharge side 213 or the discharge holes 215 of the grinder 2, and an outlet port 35 that is in communication with the drawer 6. That is, the housing 3 may take the form of a cylinder, opposite sides of which are open.

The housing 3 is connected to the support body 21 through a gasket (331, see FIG. 2), which prevents leakage of water between the support body 21 and the housing 3. Meanwhile, when the gasket 331 is formed of a vibration dampening material such as rubber, the gasket 331 may also serve to attenuate vibration between the support body 21 and the housing 3.

The outlet port 35 of the housing body 31 is opened or closed by a housing door 37 installed to the housing body 31. The housing door 37 is rotated by a housing door drive unit to selectively open the outlet port 35.

Meanwhile, the housing body 31 is supported by a vibration attenuator (38, see FIG. 2) within the cabinet 1. The vibration attenuator 38 serves to prevent vibration of the drive unit 8 located at the outer circumferential surface of the housing body 31 or vibration of the grinder 2 connected to the housing body 31 from being transmitted to the cabinet 1.

The vibration attenuator 38 may have any of various configurations so long as it can perform the above-described function. FIG. 2 illustrates the case where the vibration attenuator 38 includes a damper and a spring interposed between the cabinet 1 and the housing body 31 by way of example.

The housing body 31 is provided with a first communication portion 311 for introduction of outside air during drying of the food waste. In addition, the housing body 31 is provided with a second communication portion 313 for drainage of water or air from the housing body 31 to the outside of the cabinet 1. A detailed description thereof will follow.

The dehydrator 4, installed inside the housing body 31, serves to dehydrate and agitate the food waste ground in the grinder 2 and then supplied to the housing 3. The dehydrator 4 includes a storage body 41 located inside the housing body 31 to provide a food waste storage space, a rotating shaft 47 oriented in parallel with the ground to rotatably support the storage body 41 inside the housing body 31, and a communication hole 42 perforated in the storage body 41, the communication hole 42 being in communication with the inlet port 33 or the outlet port 35 according to a rotation angle of the storage body 41.

The storage body 41 takes the form of an empty cylinder and the rotating shaft 47 is secured to the rear surface of the storage body 41.

Meanwhile, the circumferential surface, the front surface and the rear surface of the storage body 41 is formed with a plurality of through-holes 43 to communicate the inside of the storage body 41 with the inside of the housing body 31. As such, when the storage body 41 is rotated, water contained in the food waste may be discharged to the housing body 31 through the through-holes 43.

Figure 5:
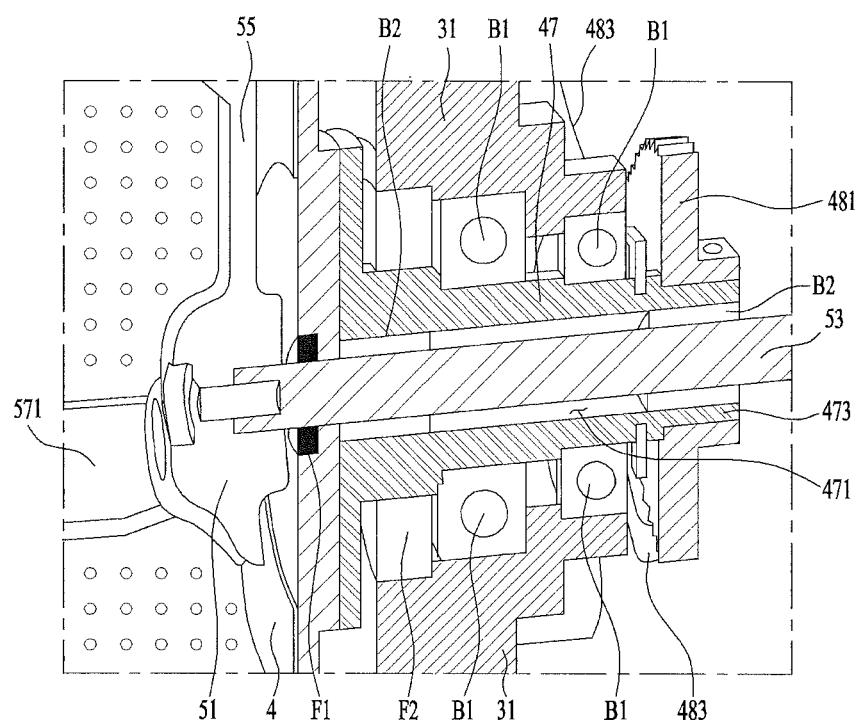
FIG. 5 is a sectional perspective view of an example shaft support portion of a food waste treatment apparatus.

As illustrated in FIGS. 4 and 5, the rotating shaft 47 serves to allow the storage body 41 to be rotatable about an axis that is in parallel with the ground. The rotating shaft 47 includes a shaft body 473 secured to the rear surface of the storage body 41 so as to penetrate the housing body 31 of the housing 3 and a shaft through-bore 471 formed through the shaft body 473 in the longitudinal direction of the shaft body 473.

The housing body 31 is provided with a bearing B1. The shaft body 473 is inserted into the bearing B1 so as to be rotatably coupled to the housing body 31. Meanwhile, a seal F2 is interposed between the housing body 31 and the shaft body 473 and serves to prevent water or food waste from entering a space between the housing body 31 and the shaft body 473.

The storage body 41 of the dehydrator 4 has a feature that it is rotated about an axis in parallel with the ground, rather than being rotated about an axis perpendicular to the ground.

In some implementations where the storage body 41 is rotated about the axis perpendicular to the ground, the user who attempts to discharge dehydrated food waste from the storage body 41 has to directly take the food waste out of the storage body 41 or to separate the storage body 41 from the food waste treatment apparatus 100, which causes user inconvenience.

In some implementations, where the storage body 41 is rotated about the axis in parallel with the ground, the dehydrated food waste may be discharged from the storage body 41 via position control of the communication hole 42. Thus, it will be appreciated that rotation of the storage body 41 about the axis in parallel with the ground is more convenient than rotation of the storage body 41 about the axis perpendicular to the ground that will be described in more detail below.

The food waste treatment apparatus 100 may further include an agitator 5 rotatably installed in the storage body 41, the agitator 5 serving to agitate the food waste inside the storage body 41 and to open or close the communication hole 42.

Figure 9:
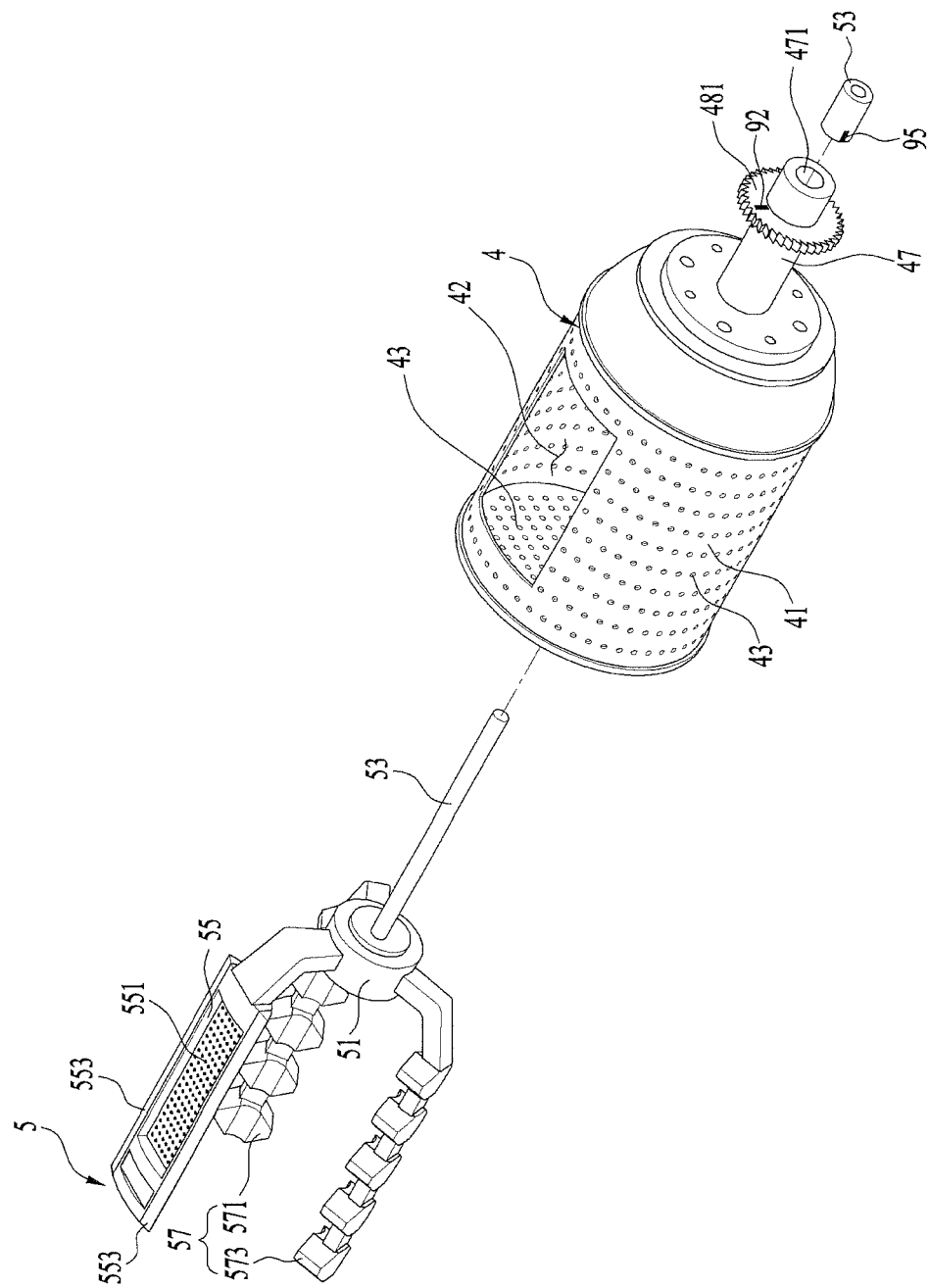
FIG. 9 is an exploded perspective view of an example dehydrator and agitator of a food waste treatment apparatus.

As illustrated in FIG. 9, the agitator 5 may include a base 51 located inside the storage body 41, an agitator rotating shaft 53 extending from the base 51 and inserted into the shaft through-bore 471, and a door blade 55 secured to the base 51 and located inside the storage body 41 to close the communication hole 42.

Meanwhile, as illustrated in FIGS. 4 and 5, the agitator rotating shaft 53 is inserted into the shaft through-bore 471 and serves to connect the base 51 and the drive unit 8, e.g., a means that serves to rotate the agitator 5 and is located outside the housing 3, to each other.

A seal F1 is provided in the shaft through-bore 471 to prevent the food waste or water inside the dehydrator 4 from entering a space between the shaft through-bore 471 and the agitator rotating shaft 53. That is, the seal F1 is affixed to the rear surface of the storage body 41 formed with the shaft through-bore 471 to prevent the food waste or water from entering the shaft through-bore 471.

The agitator rotating shaft 53 is rotatably supported by a clutch B2 that is located inside the shaft through-bore 471. The clutch B2 may be a one-way clutch that transmits power, provided by the drive unit 8 only in one direction among the clockwise direction and the counterclockwise direction, to the shaft body 473.

Accordingly, when the drive unit 8 rotates the agitator rotating shaft 53 in a first direction, e.g., any one direction among the clockwise direction and the counterclockwise direction, the clutch B2 transmits rotational power provided by the agitator rotating shaft 53 to the shaft body 473, thus causing both the storage body 41 and the agitator 5 to be rotated together.

However, when the drive unit 8 rotates the agitator rotating shaft 53 in a second direction, e.g., the other direction among the clockwise direction and the counterclockwise direction, or an opposite direction of the first direction, the clutch B2 does not transmit rotational power provided by the agitator rotating shaft 53 to the shaft body 473, thus causing only the agitator 5 to be rotated without rotation of the storage body 41.

Despite the fact that the clutch B2 allows only the agitator 5 to be rotated without rotation of the storage body 41, the food waste treatment apparatus 100 may further include a lock 48 to prevent the storage body 41 from being rotated along with the agitator 5 when the agitator rotating shaft 53 is rotated in the second direction, e.g., to prevent the storage body 41 from being unintentionally rotated along with the agitator 5.

The lock 48 may include a first fastener 481 provided at the shaft body 473 and a second fastener 483 provided at the housing body 31 so as to be separably fastened to the first fastener 481.

Figure 10:
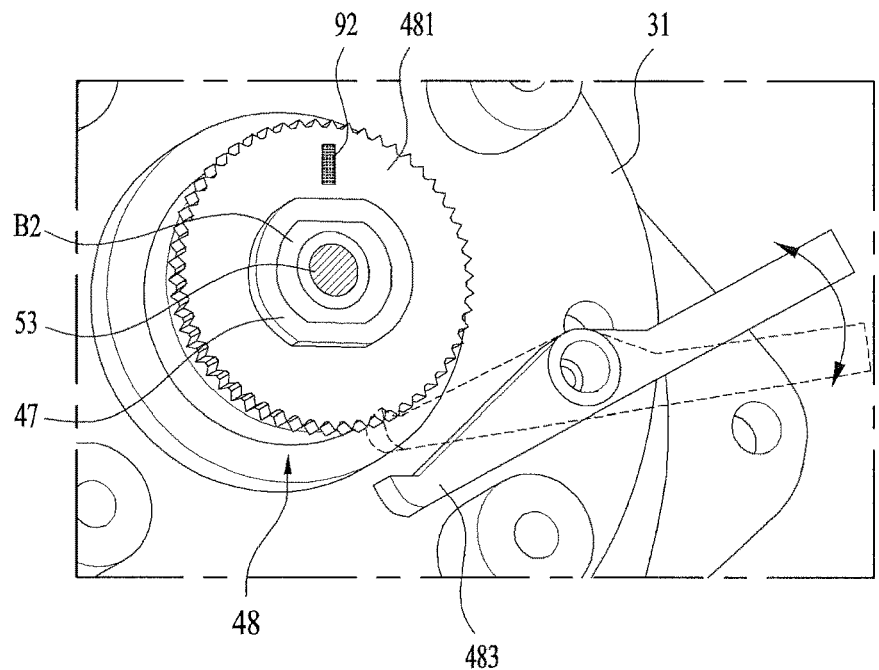
FIG. 10 is a partial perspective view of an example lock of a food waste treatment apparatus.

As illustrated in FIG. 10, the first fastener 481 may be a gear that is provided with teeth along the outer circumference thereof and secured to the shaft body 473. The second fastener 483 may be a bar that is rotatably coupled to the housing body 31 and has a free end to constrain rotation of the teeth of the first fastener 481.

The second fastener 483 is adapted to receive rotational power from a power supply device such as, for example, a motor or a solenoid. Thus, in the food waste treatment apparatus 100, the agitator 5 and the storage body 41 may be rotated together when the drive unit 8 rotates the agitator 5 in the first direction, and only the agitator 5 may be rotated when the drive unit 8 rotates the agitator 5 in the second direction in a state in which the second fastener 483 and the first fastener 481 are engaged with each other.

Meanwhile, as illustrated in FIG. 9, the agitator 5 may further include an agitation blade 57 that is secured to the base 51 so as to be rotatable inside the storage body 41. The agitation blade 47 serves to enhance agitation efficiency of the food waste stored in the storage body 41.

The agitation blade 47 may include a first agitation blade 471 and a second agitation blade 573 which are spaced apart from the door blade 55 by the same angle on the basis of the agitator rotating shaft 53. That is, in the case where the agitation blade 57 includes the first agitation blade 571 and the second agitation blade 573, the door blade 55, the first agitation blade 571 and the second agitation blade 573 are spaced apart from one another by 120 degrees about the agitator rotating shaft 53.

To facilitate easy agitation of the food waste, the first agitation blade 571 and the second agitation blade 573 may be provided with a plurality of bosses.

The door blade 55 included in the agitator 5 may have a plurality of door through-holes 551 perforated in the door blade 55 to communicate the inside of the storage body 41 with the inside of the housing body 31.

Assuming that the door blade 55 has no door through-holes 551, water separated from the food waste during rotation of the storage body 41 cannot be discharged in the direction in which the door blade 55 is located, which may cause eccentric rotation of the storage body 41. The door through-holes 551 serve to prevent this problem.

In addition, the door through-holes 551 serve to enhance drying efficiency by allowing air supplied by the dryer 73 that will be described below to be supplied into the storage body 41.

Meanwhile, to facilitate easy agitation of the food waste by the door blade 55, the door blade 55 may be provided with scrapers 553.

Figure 11:
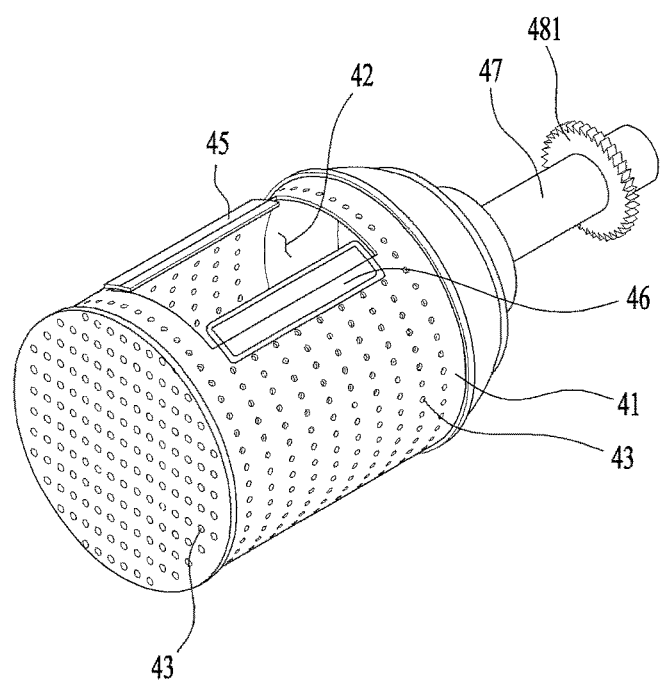
FIG. 11 is a perspective view of an example dehydrator and guide of a food waste treatment apparatus.
Figure 12:
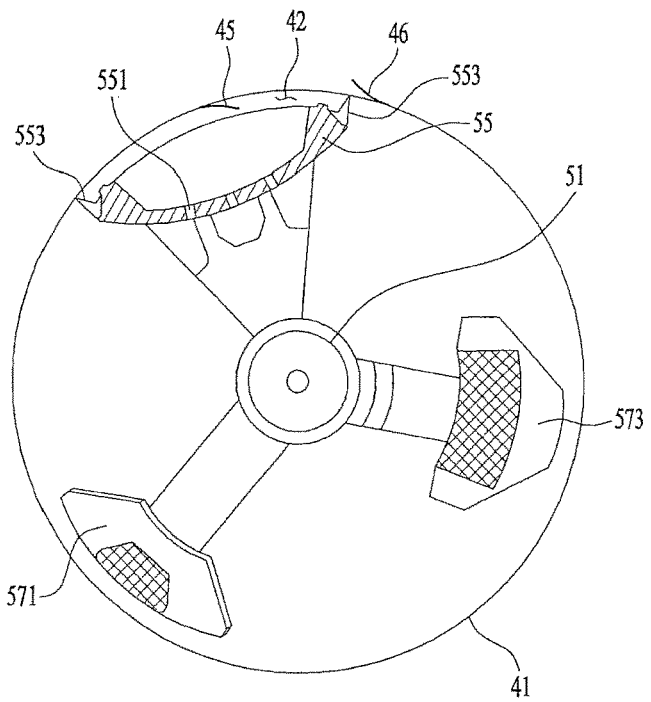
FIG. 12 is a sectional view of an example dehydrator and guide of a food waste treatment apparatus.

As illustrated in FIGS. 11 and 12, the scrapers 553 may protrude from the surface of the door blade 55 so as to come into contact with the surface of the storage body 41 and may be located respectively at both facing longitudinal ends of the door blade 55 that are in parallel with the rotation axis of the storage body 41. The scrapers 553 may be formed of an elastic material such as rubber.

When the door blade 55 provided with the scrapers 553 is rotated, the food waste stored inside the storage body 41 is easily agitated by the scrapers 553. However, the scarpers 553 may cause the food waste inside the storage body 41 to leak from the storage body 41 when the door blade 55 passes through the communication hole 42.

To solve this problem, the dehydrator 4 may further include a guide to prevent the food waste inside the storage body 41 from leaking from the storage body 41 through the communication hole 42.

The guide may include a first guide 45 protruding from the communication hole 42 toward the rotation center of the storage body 41, and a second guide 46 protruding from the communication hole 42 away from the rotation center of the storage body 41.

Accordingly, assuming that the second direction for rotation of the agitator 5 alone is set to the clockwise direction, upon rotation of the door blade 55, the first guide 45 may guide the food waste toward the storage body 41 and the second guide 46 may prevent separation of the food waste remaining on the scrapers 553.

The food waste treatment apparatus 100 having the above-described configuration may further include a first position sensing unit to sense a position of the communication hole 42 of the dehydrator 4 and a second position sensing unit to sense a position of the door blade 55.

Figure 13:
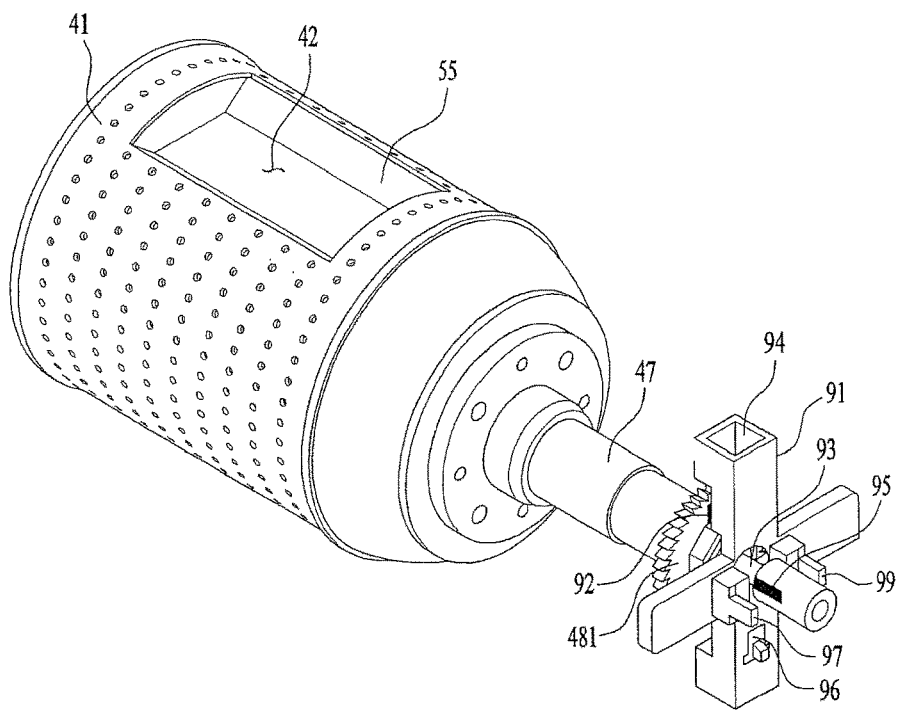
FIG. 13 is a perspective view of an example position sensing unit of a food waste treatment apparatus.

As illustrated in FIG. 13, the first position sensing unit may include a first magnetic substance 92 fixed to the rotating shaft 47 of the dehydrator 4, the first magnetic substance 92 being located next to the communication hole 42 in the longitudinal direction of the storage body 41, a first sensor 94 located at the housing body 31 at a position next to the inlet port 33 to sense the magnetic force of the first magnetic substance 92, and a second sensor 96 located at the housing body 31 at a position next to the outlet port 35 to sense the magnetic force of the first magnetic substance 92.

The first magnetic substance 92 may be attached to the first fastener 481 secured to the shaft body 473, and the first sensor 94 and the second sensor 96 may be attached to a first sensor support member 91 that is located outside the housing body 31.

In some implementations where the inlet port 33 and the outlet port 35 of the housing body 31 are located respectively at the top surface and the bottom surface of the housing body 31, e.g., spaced apart from each other by 180 degrees on the basis of the shaft body 473, the first sensor 94 and the second sensor 96 need to be spaced apart from each other by 180 degrees.

Meanwhile, the second position sensing unit may include a second magnetic substance 95 fixed to the agitator rotating shaft 53, and a third sensor 97 located outside the housing body 31, the third sensor 97 judging whether or not the door blade 55 closes the communication hole 42 by sensing the magnetic force of the second magnetic substance 95.

The second magnetic substance 95 may be spaced apart from the door blade 55 by a predetermined angle about the agitator rotating shaft 53 and may be located next to the door blade 55 in the longitudinal direction of the agitator rotating shaft 53.

Meanwhile, as illustrated in FIG. 13, there is illustrated, by way of example, the case where the second magnetic substance 95 is spaced apart from the door blade 55 by 90 degrees about the agitator rotating shaft 53 and the third sensor 97 is fixed to a second support member 93 that is located outside the housing body 31, the third sensor 97 being spaced apart from the first sensor 94 by 90 degrees.

Meanwhile, the food waste treatment apparatus 100 may further include the dryer 73 to dry the food waste stored in the dehydrator 4 by supplying air to the housing 3.

As illustrated in FIG. 3, the dryer 73 may include a supply duct 731 to guide air to the housing body 31, a fan 733 to supply air to the supply duct 731, a heater 755 to heat air introduced into the supply duct 731, and the exhaust duct 71 to communicate the inside of the housing body 31 with the outside of the cabinet 1.

The supply duct 731 may be connected to the first communication portion 311 of the housing body 31, and the exhaust duct 71 may be in communication with the rear middle region of the housing body 31 and connected to a plughole located outside the cabinet 1.

As such, when the fan 733 is operated, air inside the cabinet 1 is moved to the housing body 31 through the supply duct 731 and heated by the heater 735.

The air introduced into the housing body 31 is supplied to the inside of the storage body 41 through the through-holes 43 formed, for example, in the circumferential surface and the front surface of the storage body 41. Then, the air heat exchanged with the food waste is discharged from the cabinet 1 through the exhaust duct 71.

Hereinafter, operation of the food waste treatment apparatus 100 will be described in detail. The respective components mentioned below should be understood with reference to the above description and the accompanying drawings.

An operation process of the food waste treatment apparatus 100 will be described below in detail with reference to FIG. 14.

Figure 14:
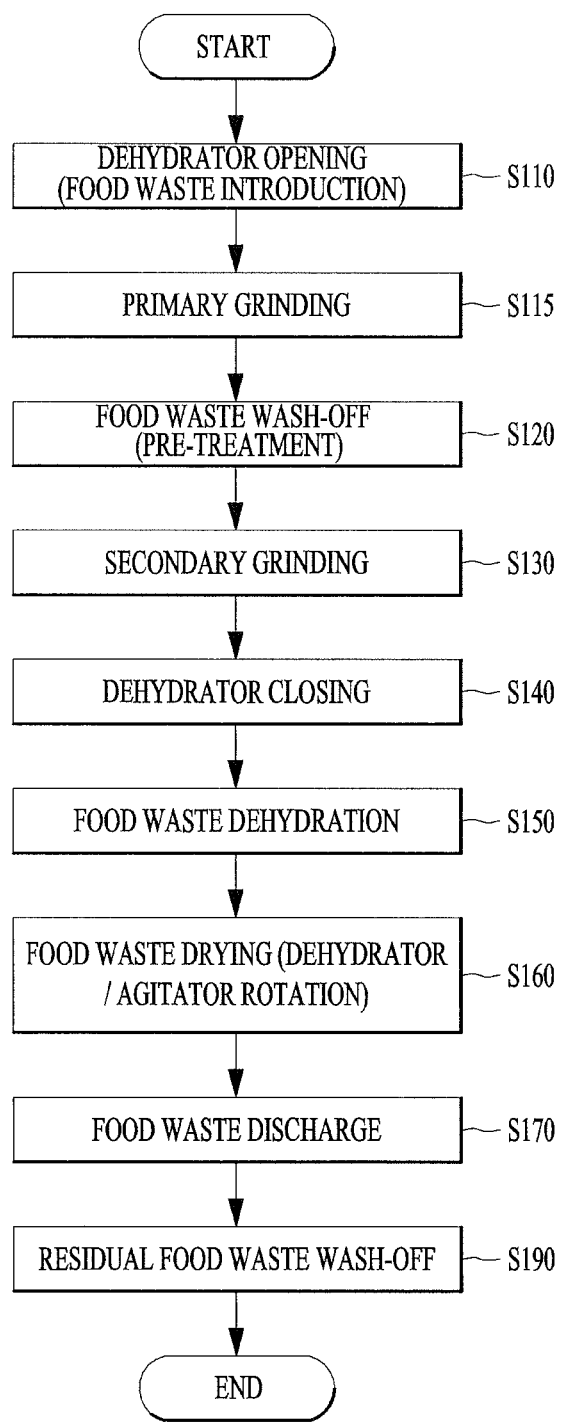
FIG. 14 is a flowchart of an example control method of a food waste treatment apparatus.

FIG. 14 illustrates an example a control method of a food waste treatment apparatus.

First, a controller performs a dehydrator opening step S110 of communicating the dehydrator 4 and the housing 3 with each other to enable introduction of food waste. When the food waste is introduced by the user as the dehydrator opening step S110 is completed, the controller proceeds to a primary grinding step S115 of primarily grinding the introduced food waste and guiding the ground food waste to the dehydrator 4. Then, the controller performs a food waste wash-off step S120 of removing, for example, highly viscous grounds or fine powder included in the food waste, primarily ground and introduced into the dehydrator 4. Once the food waste has been washed off in the food waste wash-off step S120, the controller performs a secondary grinding step S130 of grinding the food waste inside the dehydrator 4. After completion of the secondary grinding step S130, the controller proceeds to a closing step S140 of closing the communication hole 42 of the dehydrator 4. Then, the closing step S140 is followed by a food waste dehydration step S150 of removing moisture contained in the ground food waste. Then, the controller proceeds to a food waste drying step S160 and a food waste discharge step S170 in sequence. Finally, once the dried food waste has been discharged, the controller proceeds to a residual food waste wash-off step S190 of washing the housing 3 and the dehydrator 4 having undergone the washing, grinding, and drying of the food waste.

Meanwhile, among the steps as described above, the food waste wash-off step S120 of removing highly viscous grounds or fine powder included in the food waste from the food waste and the residual food waste wash-off step S190 of washing off food waste residues inside the food waste treatment apparatus 100, which has performed the washing, grinding and drying of the food waste, after completion of all of the aforementioned steps may be selectively performed according to user selection, and may be omitted as needed.

The dehydrator opening step S110 includes communicating the communication hole 42 with the inlet port 33 of the housing 3 by rotating the dehydrator 4 and opening the communication hole 42 by the door blade 55 via rotation of the agitator 5 alone. Here, whether or not the communication hole 42 reaches a position for communication with the inlet port 33 is judged based on whether or not the first sensor 94 senses the magnetic force of the first magnetic substance 92.

That is, since the first magnetic substance 92 is fixed to the rotating shaft 47 of the dehydrator 4 so as to be located next to the communication hole 42 and the first sensor 94 is attached to the housing 3 so as to be located next to the inlet port 33, a controller, e.g., a device to control operation of the drive unit 8, change in the rotation direction of the drive unit 8, operation of the dryer 73 and the dehydrator 4, and operation of the wash water ejector, may determine that the communication hole 42 is located below the inlet port 33 when the first sensor 94 senses the magnetic force of the first magnetic substance 92.

Upon judging that the communication hole 42 is located below the inlet port 33, the controller stops operation of the drive unit 8 to stop rotation of the dehydrator 4 and the agitator 5.

In some implementations, the controller may change the rotation direction of the drive unit 8 to allow the agitator 5 to be rotated in the second direction, e.g., so that the dehydrator 4 stops and only the agitator 5 is rotated, thereby causing the door blade 55 to open the communication hole 42.

That is, since the second magnetic substance 95 and the third sensor 97 are provided respectively at the agitator rotating shaft 53 and the housing 3 so as to face each other when the door blade 55 closes the communication hole 42, the controller may determine that the door blade 55 closes the communication hole 42 when the third sensor 97 senses the magnetic force of the second magnetic substance 95 and may also determine that the door blade 55 opens the communication hole 42 when the third sensor 97 cannot sense the magnetic force of the second magnetic substance 95.

Accordingly, upon judging that the third sensor 97 senses the second magnetic substance 95, the controller rotates only the agitator 5 until the third sensor 97 cannot sense the second magnetic substance 95, thereby opening the communication hole 42 of the dehydrator 4. In some implementations, a positional relationship between the housing 3, the dehydrator 4, and the agitator 5 is as illustrated in FIG. 8(*a*).

Subsequently, the grinding step S115 of primarily grinding the introduced food waste is performed. The grinding step S115 is a step in which the controller rotates the first rotary cutter 22 and the second rotary cutter 23 via the drive unit 8 or a separate drive unit. The grinding step S115 may further include ejecting water via the wash water ejector 28 and 29 during rotation of the first rotary cutter 22 and the second rotary cutter 23. This serves to prevent the food waste from remaining on the first and second rotary cutters 22 and 23.

Meanwhile, upon completion of the primary grinding step S115, the controller may perform the food waste wash-off step S120 of washing off the food waste received in the dehydrator 4. Here, the food waste wash-off step S120 serves to remove highly viscous food waste grounds or fine food waste powder, which may hinder implementation of the grinding step S130, included in the food waste received in the dehydrator 4.

The food waste wash-off step S120 includes a wash water supply process of washing off highly viscous grounds and fine powder included in the food waste, a food waste rinsing process of removing the highly viscous grounds and fine powder included in the food waste using the supplied wash water, and a wash water drainage process of draining the wash water used to wash off the food waste.

First, prior to supplying wash water to the housing body 31, the housing door 37 provided at the bottom of the housing body 31 is closed. Here, in a state in which the housing door 37 has already been closed, a process of closing the housing door 37 may be omitted.

Subsequently, wash water for rinsing off the food waste is supplied to the housing body 31. The supply of wash water may be performed via the first nozzle 28 and the second nozzle 29 of the wash water ejector included in the grinder 2, and may be directly performed within the housing body 31 via a separate water supply aperture.

Meanwhile, upon completion of the supply of wash water, a process of rinsing off the food waste stored in the dehydrator 4 is performed. Here, the process of rinsing off the food waste may selectively include rotating the agitator 5 alone and rotating the agitator 5 and the dehydrator 4 simultaneously.

First, the case where the dehydrator 4 remains stationary and only the agitator 5 is rotated in the food waste rinsing process will be described below.

The controller maintains communication between the communication hole 42 of the dehydrator 4 and the inlet port 33 of the housing body 31 as in the above-described dehydrator opening step S110 and rotates the agitator 5 at predetermined RPM for a predetermined time to mix the food waste stored in the dehydrator 4 with wash water. Thereby, as the food waste received in the dehydrator 4 is mixed with the wash water stored in the housing body 31, highly viscous grounds and fine powder included in the food waste are diluted or separated.

Next, the case where the agitator 5 and the dehydrator 4 are rotated simultaneously in the food waste rinsing process will be described.

To rotate the agitator 5 and the dehydrator 4 simultaneously, first, it is necessary to close the communication hole 42 formed in the dehydrator 4. That is, when the agitator 5 and the dehydrator 4 are rotated in a state in which the communication hole 42 of the dehydrator 5 is not closed, the food waste introduced into the dehydrator 4 may leak from between the dehydrator 4 and the housing body 31. Therefore, the communication hole 42 of the dehydrator 4 needs to be closed using the door blade 55 of the agitator 5 before the dehydrator 4 and the agitator 5 are rotated simultaneously.

Here, closing of the communication hole 42 of the dehydrator 4 is performed based on judgment of whether or not the third sensor 97 senses the magnetic force of the second magnetic substance 95. Since that the third sensor 97 cannot sense the magnetic force of the second magnetic substance 95 means that the communication hole 42 of the dehydrator 4 is opened, the controller rotates the drive unit 8 in the second direction, e.g., so as to rotate only the agitator 5, until the third sensor 97 senses the magnetic force of the second magnetic substance 95. A positional relationship between the housing 3, the dehydrator 4, and the agitator 5 in a closed state of the communication hole 42 of the dehydrator 4 is as illustrated in FIG. 8(b).

Subsequently, the dehydrator 4 and the agitator 5 remain in a state in which the door blade 55 of the agitator 5 closes the communication hole 42 of the dehydrator 4. The agitator 5 and the dehydrator 4 are rotated at predetermined RPM for a predetermined time to mix the food stored in the dehydrator 4 with wash water. Thereby, as the food waste received in the dehydrator 4 is mixed with the wash water stored in the housing body 31, highly viscous grounds and fine powder included in the food waste are diluted or separated.

Meanwhile, once impurities such as, for example, the highly viscous grounds and fine powder have been separated from the food waste via rotation of the dehydrator 4 and/or the agitator 5, the wash water mixed with the impurities such as, for example, the highly viscous grounds and fine powder is drained. Here, drainage of the wash water may be performed by opening the exhaust duct 71 provided at the housing body 31.

Subsequently, the food waste wash-off step S120 of the dehydrator 4 is completed, and the controller performs the secondary grinding step S130 of secondarily grinding the food waste stored in the dehydrator 4. Here, the secondary grinding step S130 is a process of mixing and grinding the food waste stored in the dehydrator 4 by rotating only the agitator 5 in a state in which rotation of the dehydrator 4 stops. Here, through rotation of the agitator 5, the food waste stored in the dehydrator 4 is agitated within the dehydrator 4 by the door blade 55 and the agitation blade 57 of the agitator 5 and, simultaneously, ground by friction with the inner surface of the dehydrator 4. However, only the primary grinding step S110 using the grinder 2 may be performed and the secondary grinding step S130 may be omitted according to the amount and kind of the food waste.

Subsequently, upon completion of the food waste wash-off step S120 or the secondary grinding step S130, the dehydrator closing step S140 of closing the dehydrator 4 for dehydration of the food waste is performed. The food waste treatment apparatus 100 is adapted to perform dehydration of the food waste by simultaneously rotating the agitator 5 and the dehydrator 4.

Accordingly, when the agitator 5 and the dehydrator 4 are rotated in a state in which the communication hole 42 of the dehydrator 4 is not closed, the food waste introduced into the dehydrator 4 may leak from between the dehydrator 4 and the housing body 31. Accordingly, it is necessary to close the communication hole 42 of the dehydrator 4 using the door blade 55 of the agitator 5 prior to simultaneously rotating the dehydrator 4 and the agitator 5.

Meanwhile, the controller judges whether or not the grinder 2 is operated and stands by the operation stop of the grinder 2 upon judging that operation of the grinder 2 does not stop. Here, upon checking the operation stop of the grinder 2, the controller begins sensing of the third sensor 97.

Here, closing of the communication hole 42 of the dehydrator 4 is performed based on judgment of whether or not the third sensor 97 senses the magnetic force of the second magnetic substance 95. Since that the third sensor 97 cannot sense the magnetic force of the second magnetic substance 95 means that the communication hole 42 of the dehydrator 4 is opened, the controller rotates the drive unit 8 in the second direction, e.g., so as to rotate only the agitator 5, until the third sensor 97 senses the magnetic force of the second magnetic substance 95. A positional relationship of the housing 3, the dehydrator 4, and the agitator 5 in a closed state of the communication hole 42 of the dehydrator 4 is as illustrated in FIG. 8(b).

Subsequently, the controller performs the dehydration step S150 of dehydrating the food waste stored in the dehydrator 4 upon completion of the dehydrator closing step S140.

The dehydration step S150 is a step of discharging the water contained in the food waste from the storage body 41 of the dehydrator 4 into the housing body 31 by simultaneously rotating the dehydrator 4 and the agitator 5 at a predetermined first RPM, e.g., so as to rotate the agitator rotating shaft 53 in the first direction.

Here, the storage body 41 of the dehydrator 4 may fail to maintain dynamic equilibrium, or dynamic balance, according to a position of the food waste stored therein, thereby being rotated. Dynamic equilibrium means a state in which centrifugal force or moment created by the centrifugal force becomes zero with respect to a rotating shaft during rotation of a rotator. In the case of a rigid body, the rigid body maintains dynamic equilibrium when mass distribution is constant about a rotating shaft.

Dynamic equilibrium in the food waste treatment apparatus 100 may be understood as the case where mass distribution of the food waste about the rotating shaft 47 of the storage body 41 is within an allowable range during rotation of the storage body 41 in which the food waste is received, e.g. the case where the storage body 41 is rotated while vibrating within an allowable range.

In some implementations, an unbalanced state in the food waste treatment apparatus 100 occurs in the case where mass distribution of the food waste about the rotating shaft 47 is not uniform, e.g., not within an allowable range, during rotation of the storage body 41, e.g. the case where the food waste is not uniformly distributed within the storage body 41.

At this time, when the storage body 41 is rotated in an unbalanced state, this may cause deterioration in dehydration efficiency and generation of vibration and noise of the storage body 41 and the housing body 31. Therefore, it is necessary to remove such unbalance prior to beginning the dehydration step S150.

For unbalance removal, unbalance of the storage body 41 of the dehydrator 4 is sensed and whether the sensed unbalance is a reference UB, or reference value, or less is judged.

Here, unbalance sensing is sensing an RPM variation of the storage body 41 after rotating the agitator 5 and the storage body 41 at a second RPM that is lower than the first RPM so as to keep the communication hole 42 closed. In addition, judgment of the unbalanced state of the storage body 41 is based on sensing whether or not the storage body 41 is in the unbalanced state by comparing the measured RPM variation with the reference value.

The RPM variation of the storage body 41 and the agitator 5 may be measured using various methods. For example, a Hall sensor may be used to sense the magnetic force of a magnetic substance provided at a rotor of the drive unit 8.

In some implementations, the controller may determine the RPM variation by subtracting the minimum RPM from the maximum RPM of the storage body 41 based on a signal transmitted from the Hall sensor after rotating the storage body 41 and the agitator 5 at the second RPM for a given time via the drive unit 8.

Meanwhile, when the measured RPM variation is a predetermined reference value or less, the controller judges that the food waste stored in the storage body 41 is not in an eccentric state relative to the rotating shaft 47. However, when the measured RPM variation is greater than the predetermined reference value, the controller judges that the food waste is in an eccentric state relative to the rotating shaft 47.

When the food waste stored in the storage body 41 is not in an eccentric state relative to the rotating shaft 47, the controller directly performs the dehydration step S150. However, when the food waste stored in the storage body 41 is in an eccentric state relative to the rotating shaft 47, the controller supplies water to the housing body 31 and rotates the agitator 5 so as to remove unbalance of the storage body 41.

More specifically, the controller may remove unbalance by rotating only the agitator 5 without rotating the storage body 41 so as to rearrange the food waste within the storage body 41 during rotation of the agitator 5.

Meanwhile, when attempting to rotate only the agitator 5, this needs to be performed after a position of the dehydrator 4 is controlled so that the communication hole 42 of the storage body 41 is located to communicate with the inlet port 33 of the housing body 31, in order to prevent the food waste within the storage body 41 from being discharged to the housing body 31. Thus, when attempting to rotate only the agitator 5, a process of controlling a position of the communication hole 42 may be performed and a process of controlling a position of the door blade 55 to close the communication hole 42 when rotation of the agitator 5 stops may be performed.

In addition, the supply of water for unbalance removal may be performed via the wash water ejector 28 and 29 included in the grinder 2 and may be performed via a separate supply pipe that connects the housing body 31 and an external water supply source to each other.

Water supplied to the housing body 31 via the water supply process may be introduced into the storage body 41 through the through-holes 43 of the storage body 41. Therefore, the water supplied to the housing body 31 causes the food waste to be rearranged within the storage body 41, which enables removal of the unbalanced state.

Although the unbalance sensing process as described above has been described based on the case where a UB sensing process of sensing whether or not the storage body 41 is in the unbalanced state is performed, the sensing process included in the control method may further include a load sensing process of determining the amount of the food waste stored in the storage body 41 in addition to the above-described unbalance sensing process.

Here, determining the amount of the food waste stored in the storage body 41 serves to reduce a dehydration time by increasing the first RPM, which is set for the dehydration step S150, so as to be proportional to the amount of the food waste.

In addition, when the amount of the food waste is determined, the dehydration time set for the dehydration step S150 may be increased in proportion to the amount of the food waste, which may result in complete dehydration of the food waste.

In addition, when the amount of the food waste is determined, the output, e.g., heat emission, of the heater 735 may be increased in proportion to the amount of the food waste in the drying step S160 that will be described below, or an implementation time, e.g., drying time, of the drying step S160 may be increased in proportion to the amount of the food waste, which may result in reduced drying time and complete drying of the food waste.

Then, the process of determining the amount of the food waste may be performed by measuring a time from a point in time when supply of power to the drive unit 8, which rotates the dehydrator 4 and the agitator 5 at the second RPM for unbalance sensing stops to a point in time when rotation of the dehydrator 4 and the agitator 5 stops.

The amount of the food waste stored in the storage body 41 of the dehydrator 4 is proportional to a time required to stop rotation of the storage body 41 and the agitator 5 that are being rotated at the second RPM.

Accordingly, when the controller compares a time required to stop rotation of the storage body 41 that is being rotated at the second RPM after stopping the supply of power to the drive unit 8 with time data required to stop rotation of the storage body 41 that is being rotated at the second RPM according to the amount of food waste, the controller may determine the amount of the food waste stored in the storage body 41.

Meanwhile, when it is desired to perform both the food waste unbalance sensing process and the food waste amount sensing process, the food waste unbalance sensing process is followed by the food waste amount sensing process. Subsequently, at least one of a water supply process and an agitation process may be performed according to the sensed results of the unbalanced state and amount of the food waste.

Meanwhile, upon judging that unbalance of the storage body 41 of the dehydrator 4 is removed, the control method proceeds to the dehydration step S150 of rotating both the storage body 41 and the agitator 5 together so that the communication hole 42 of the storage body 41 remains closed by the door blade 55 of the agitator 5.

Meanwhile, revolutions per minute, or first RPM, and a reference dehydration time of the storage body 41, which are set for the dehydration step S150, may be set to fixed values regardless of the amount of the food waste stored in the storage body 41, or may be set to be increased in proportion to the amount of the food waste measured in the second sensing step as described above.

In some implementations, the controller may set dehydration time data corresponding to the amount of the food waste currently stored in the storage body 41, among a plurality of pieces of dehydration time data that may be stored in the controller or a separate storage medium and sorted according to the amount of food waste, to the reference dehydration time.

When the rotation time, e.g., dehydration time, of the storage body 41 and the agitator 5 reaches the reference dehydration time, the control method proceeds to the drying step S160 of drying the food waste within the storage body 41.

The drying step S160 may include a drying process of drying the food waste and a determination process of determining a drying time of the food waste.

Here, the drying step S160 may include only a process of supplying hot air into the housing body 31 via the dryer 73, or may further include a process of rotating only the agitator 5 that is simultaneously performed with the process of supplying hot air.

In some implementations, where the drying step S160 includes the process of rotating the agitator 5, the control method may proceed to the drying step S160 after performing a process of controlling a position of the dehydrator 4 so that the communication hole 42 of the storage body 41 communicates with the inlet port 33 of the housing body 31.

This serves to prevent the food waste stored in the storage body 41 from leaking to the housing body 31 when the agitator 5 is rotated during implementation of the drying step S160. That is, upon implementation of the drying step 160 in which the agitator 5 is rotated, a process of controlling a position of the communication hole 42, a process of rotating only the agitator 5, and a process of controlling a position of the door blade 55 so as to close the communication hole 42 by the door blade 55 when rotation of the agitator 5 stops may be performed.

Meanwhile, the drying step S160 may be continuously performed while hot air is supplied to the housing body 31, e.g., for a reference drying time, and may be repeated plural times within the reference drying time.

The reference drying time, which is set for the drying step S160, may be preset to a fixed value regardless of the amount of the food waste, or may be set to be increased in proportion to the amount of the food waste measured in the above-described food waste amount sensing process.

In some implementations, the controller may set drying time data corresponding to the amount of the food waste currently stored in the storage body 41, among a plurality of pieces of drying time data that may be stored in the controller or a separate storage medium and sorted according to the amount of food waste, to the reference drying time.

The above-described drying step S160 ends when a time for which hot air is supplied to the food waste, e.g., drying time, reaches the reference drying time. When the drying step S160 ends, the control method proceeds to the food waste discharge step S170 of discharging the food waste stored in the storage body 41 to the drawer 6.

The food waste discharge step S170 may include a communication process of communicating the communication hole 42 with the outlet port 35 of the housing 3 by rotating the dehydrator 4, an outlet port opening process of opening the outlet port 35 by controlling the housing door 37, and a discharge process of discharging the food waste from the storage body 41 by rotating only the agitator 5.

The communication process of communicating the communication hole 42 with the outlet port 35 of the housing 3 by rotating the dehydrator 4 includes causing the agitator 5 and the dehydrator 4 to be rotated together as the drive unit 8 rotates the agitator rotating shaft 53 in the first direction and stopping the rotation of the dehydrator 4 and the agitator 5 when the communication hole 42 of the dehydrator 4 reaches a position coinciding with the outlet port 35 of the housing 3. Here, judgment of whether or not the communication hole 42 reaches the position for communication with the outlet port 35 is performed based on whether or not the second sensor 96 senses the magnetic force of the first magnetic substance 92. That is, since the first magnetic substance 92 is fixed to the rotating shaft 47 of the dehydrator 4 so as to be located next to the communication hole 42 and the second sensor 96 is attached to the housing 3 so as to be located next to the outlet port 35, the controller may check that the communication hole 42 is located above the outlet port 35 when the second sensor 96 senses the magnetic force of the first magnetic substance 92. Here, upon judging that the communication hole 42 is located above the outlet port 35, the controller stops operation of the drive unit 8 to stop rotation of the dehydrator 4 and the agitator 5.

Meanwhile, when the communication process of communicating the communication hole 42 with the outlet port 35 of the housing 3 by rotating the dehydrator 4 is completed, an outlet port opening process of opening the outlet port 35 of the housing 3 by the housing door 37 is performed.

When the outlet port opening process of opening the outlet port 35 of the housing 3 by the housing door 37 is completed, the controller performs a discharge process of rotating only the agitator 5 for a given time by changing the rotation direction of the drive unit 8 to the second direction.

When the discharge process is performed for a predetermined time, the food waste inside the storage body 41 is discharged to the drawer 6 through the communication hole 42 and the outlet port 35 via rotation of the agitator 5. At this time, a positional relationship of the housing 3, the dehydrator 4 and the agitator 5 is as illustrated in FIG. 8(c). The control method may end simultaneously with completion of the discharge process.

In some implementations, the control method may further include a step of closing the communication hole 42 by the door blade 55 or closing the outlet port 35 by the housing door 37 after completion of the discharge process.

In some implementations where the second position sensing unit includes only the second magnetic substance 95 and the third sensor 97, the communication hole closing step may include a process of rotating the dehydrator 4 and the agitator 5 together until the first sensor 94 senses the magnetic force of the first magnetic substance 92, e.g., until the communication hole 42 reaches a position for communication with the inlet port 33, and a process of rotating only the agitator 5 until the third sensor 97 senses the magnetic force of the second magnetic substance 95.

However, in some implementations where the second position sensing unit further includes a fourth sensor (99, see FIG. 13) that is fixed to the housing body 31 and spaced apart from the third sensor 97 by 180 degrees, the communication hole closing step may include a process of rotating only the agitator 5 until the fourth sensor 99 senses the magnetic force of the second magnetic substance 95.

Since the second magnetic substance 95 and the third sensor 97 are located at positions where whether or not the door blade 55 has closed the communication hole 42 may be judged, in a state in which the fourth sensor 99 is spaced apart from the third sensor 97 by 180 degrees, the door 44 may be located above the outlet port 35 when the fourth sensor 99 senses the magnetic force of the second magnetic substance 95.

Accordingly, the communication hole 42, which is located to communicate with the outlet port 35 after completion of the discharge step S170, is closed by the door blade 55 when the fourth sensor 99 senses the magnetic force of the second magnetic substance 95.

Meanwhile, closing the outlet port 35 serves to allow water introduced into the housing 3 through the drain D in the sink S to move to the exhaust duct 71 through the second communication portion 313 other than the drawer 6.

The process of closing the outlet port 35 may be performed simultaneously with or before the process of closing the communication hole 42 by the door blade 55.

Subsequently, upon judging that the discharge of the food waste is completed, the residual food waste wash-off step S190 of washing off the residual food waste remaining in the housing body 31 of the housing 3, the storage body 41 of the dehydrator 4, and the door blade 55 and the agitation blade 57 of the agitator 5 is performed.

The residual food waste wash-off step S190 includes closing the housing door 37 provided at the bottom of the housing body 31 prior to supplying wash water to the housing body 31. Here, in a state in which the housing door 37 has already been closed, the process of closing the housing door 37 may be omitted.

Subsequently, wash water for rinsing off the food waste is supplied to the housing body 31. The supply of wash water may be performed via the first nozzle 28 and the second nozzle 29 of the wash water ejector included in the grinder 2, or may be directly performed within the housing body 31 by a separate water supply aperture.

Meanwhile, upon completion of the supply of wash water, a wash-off process of washing off the residual food waste remaining on the housing body 31, the dehydrator 4, and the agitator 5 is performed. Here, the wash-off process may selectively include a process of rotating the agitator 5 and a process of simultaneously rotating the agitator 5 and the dehydrator 4.

First, in the case where the dehydrator 4 remains stationary and only the agitator 5 is rotated in the wash-off process, the agitator 5 is rotated at predetermined RPM for a predetermined time to separate food waste residues attached to the respective blades 55 and 57 of the agitator 5 and food waste residues remaining on the inner wall of the dehydrator 4.

Hereinafter, in the case where the agitator 5 and the dehydrator 4 are rotated simultaneously in the wash-off process, the dehydrator 4 and the agitator 5 are rotated at predetermined RPM for a predetermined time to separate food waste residues attached to the inner wall of the housing body 31 and the inner wall of the dehydrator 4.

The rotation of the agitator 4 as well as the rotation of both the agitator 5 and the dehydrator 4 in the wash-off process as described above may be selectively performed according to user setting, or may be, at some implementations, be performed at a predetermined interval.

Thereafter, upon completion of washing of the housing body 31, the dehydrator 4 and the agitator 5, the controller performs a wash water drainage process of discharging the wash water. Here, prior to performing the wash water drainage process, it is necessary to perform a process of aligning the communication hole 42 of the dehydrator 4 with the bottom of the housing body 31.

To align the communication hole 42 of the dehydrator 4 so as to face the bottom of the housing body 31, first, the controller rotates the dehydrator 4 and judges whether or not the communication hole 42 faces the bottom of the housing body 31 based on whether or not the second sensor 96 senses the magnetic force of the first magnetic substance 92. Thereby, the wash water used to wash the food waste residues in the housing body 31, the dehydrator 4 and the agitator 5 is discharged to the discharge duct 71 of the housing body 31 through the communication hole 42 of the dehydrator 4.

Hereinafter, other implementations of the agitator included in the food waste treatment apparatus will be described.

In the following description of agitators, the above-described components of the food waste treatment apparatus will be described using the same names and the same reference numerals, and the same structures as those of the agitator according to the above-described implementations are designated by the same names. However, for description between the respective implementations and convenience of discrimination of the implementations, different reference numerals may be used in other implementations. Thus, the agitator of other implementations to be described below should be understood with reference to the structure and operation description of the agitator according to the above-described implementation.

Figure 15:
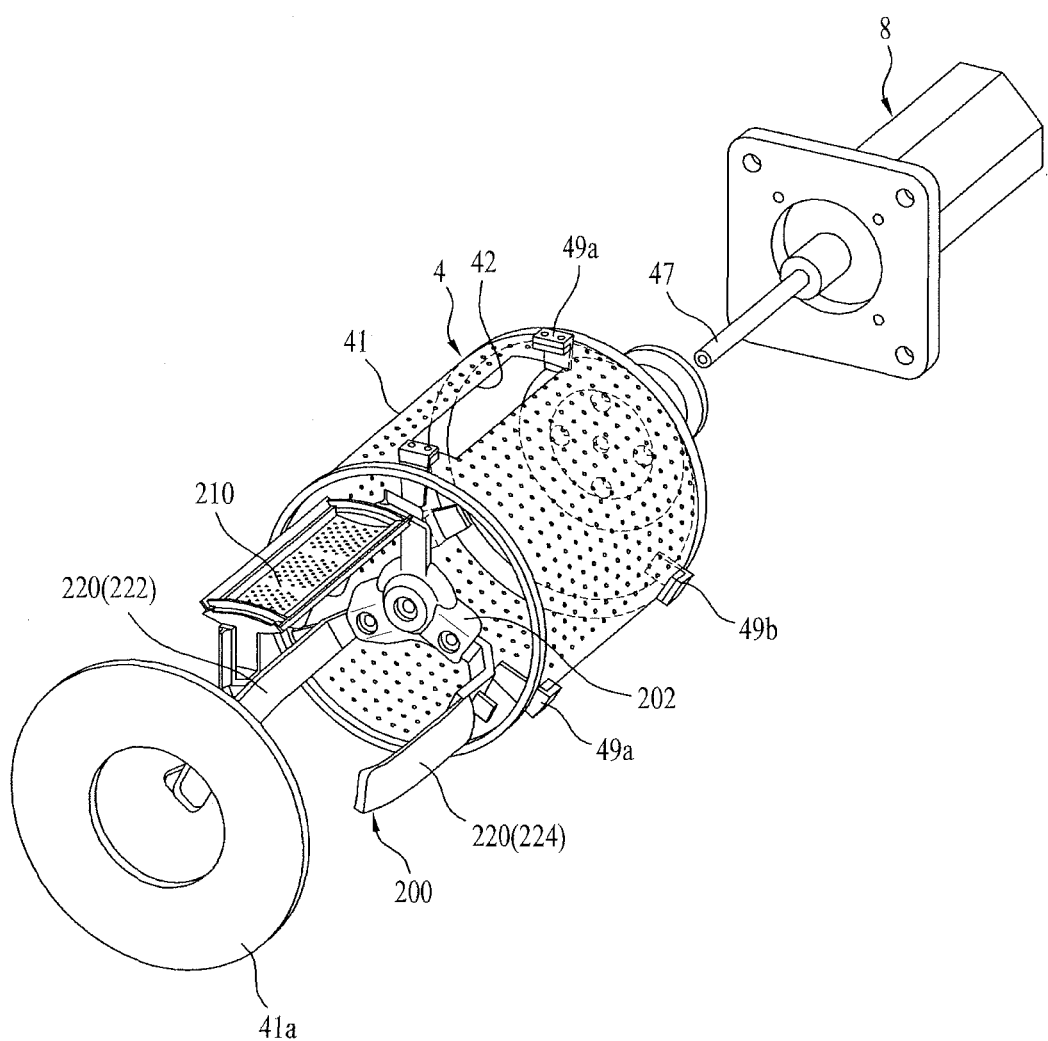
FIG. 15 is an exploded perspective view of an example dehydrator and agitator.

First, the dehydrator 4 and an agitator 200 will be described with reference to FIGS. 15 to 22. FIG. 15 illustrates an example dehydrator and agitator.

Figure 16:
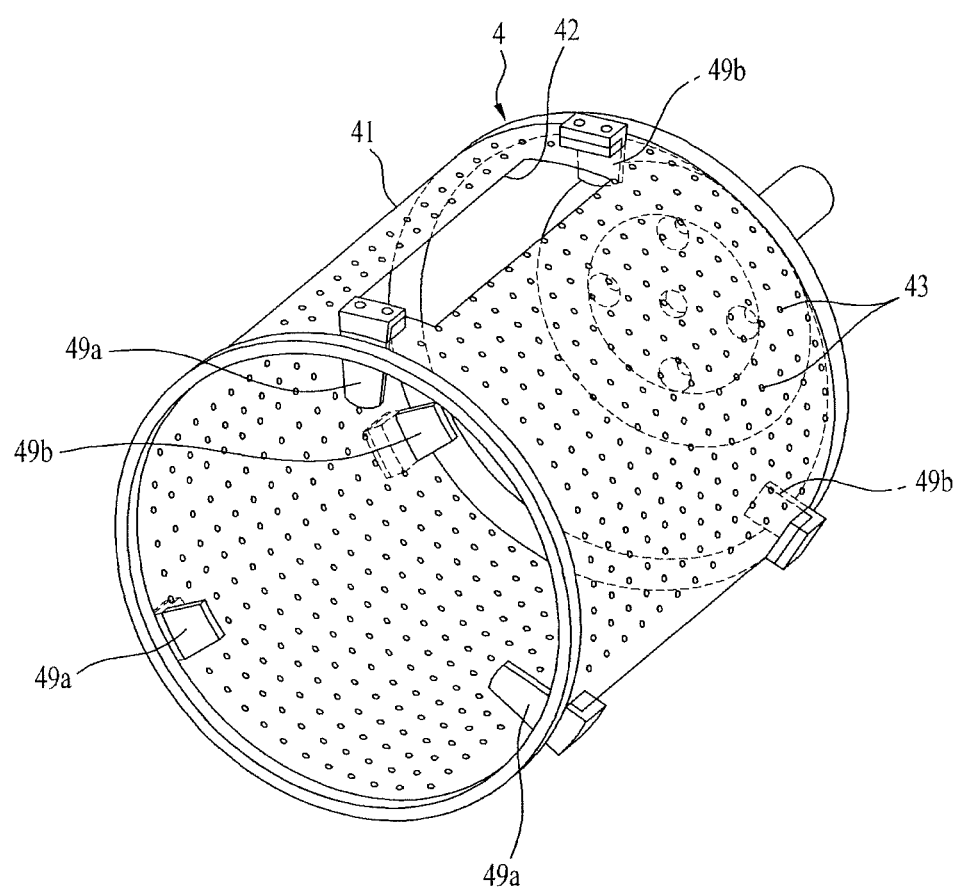
FIG. 16 is a perspective view of an example dehydrator.
Figure 17:
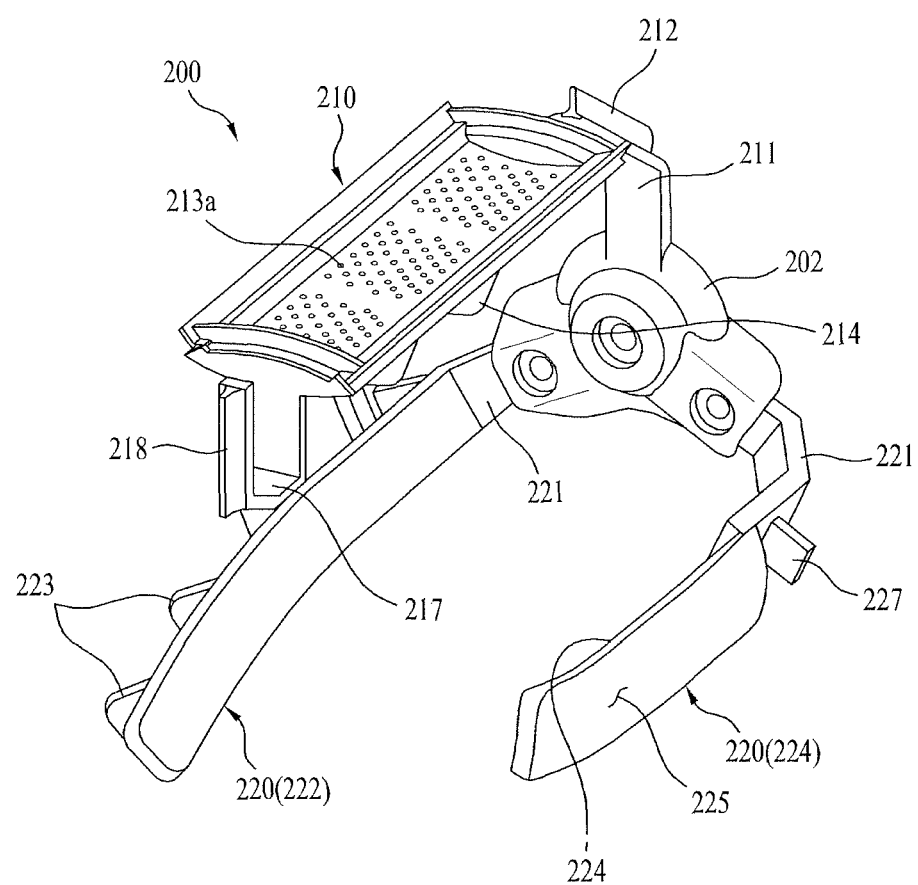
FIG. 17 is a perspective view of an example agitator.

First, the dehydrator 4 will be described. As illustrated in FIGS. 15 and 16, the dehydrator 4 is received in the housing body 31 and serves to dehydrate and agitate the food waste supplied to the housing 3 after being ground in the grinder 2. The dehydrator 4 includes the storage body 41 located inside the housing body 31 to provide a food waste storage space, the rotating shaft 47 oriented in parallel with the ground to rotatably support the storage body 41 inside the housing body 31, and the communication hole 42 perforated in the storage body 41, the communication hole 42 being in communication with the inlet port 33 or the outlet port 35 according to a rotation angle of the storage body 41.

The storage body 41 takes the form of an empty cylinder and the rotating shaft 47 penetrates and is secured to the rear surface of the storage body 41. A front cover 41a defining the front of the storage body 41 is provided at the front side of the storage body 41. The front cover 41a has a through-hole 41b to enable introduction of the air supplied from the dryer 73.

Meanwhile, the circumferential surface and the rear surface of the storage body 41 and the front cover 41a are formed with the through-holes 43 to communicate the inside of the storage body 41 with the inside of the housing body 31. As such, when the storage body 41 is rotated, water contained in the food waste may be discharged to the housing body 31 through the through-holes 43.

In addition, the storage body 41 is provided at the front and rear ends thereof with a plurality of front cutters 49a and a plurality of rear cutters 49b. These cutters 49a and 49b protrude inward of the storage body 41 so as to grind the food waste stored in the storage body 41 via interference of the agitator 200 that will be described below. The front cutters 49a and the rear cutters 49b will be described below upon description of the agitator 200.

The agitator 200 includes a base 202 that is located inside the storage body 41 of the dehydrator 4 and coupled to the agitator rotating shaft 53 passing through the shaft throughbore of the storage body 41, a plurality of connection bars 211 and 221 that radially extends about the agitator rotating shaft 53 from the outer circumference of the base 202, a door blade 210 that is coupled to an end of a specific one of the connection bars 211 and serves to close the communication hole 42 of the storage body 41, and a plurality of agitation blades 220 that is respectively provided at the other connection bars 221 and serves to perform agitation, grinding and scraping of the food waste stored in the storage body 41.

Figure 18:
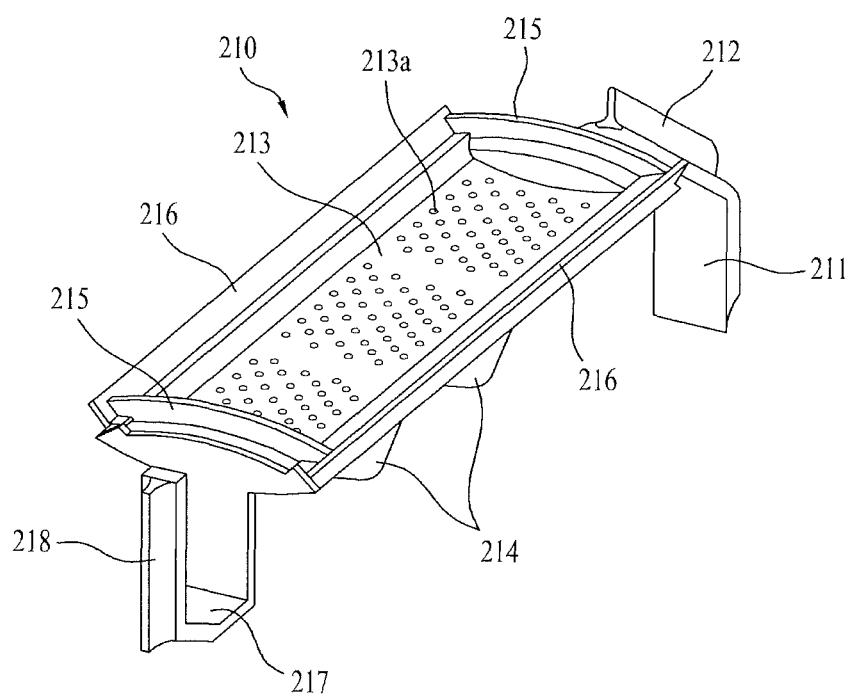
FIG. 18 is a perspective view of an example door blade of an agitator.

The door blade 210, as illustrated in FIG. 18, includes a door 213 that extends from the end of the connection bar 211 in the rotation axis direction along the inner circumferential surface of the storage body 41 so as to have a shape corresponding to the communication hole 42 of the storage body 41. The door 213 has a plurality of through-holes 213a formed therein to assure discharge of water from the food waste stored in the dehydrator 4 during rotation of the dehydrator 4. A plurality of inward cutters 214 protrudes from the lower surface of the door 213, e.g. inward of the storage body 41, to grind the food waste stored in the storage body 41. Thereby, as the agitator 200 is rotated, some of the food waste stored in the storage body 41, which is relatively large in size and has moved toward the center of the storage body 41 via rotation of the agitator 200, may be ground by the inward cutters 214 formed at the door blade 210.

Meanwhile, the connection bar 211 of the door blade 210 is provided with a rear scraper 212. The rear scraper 212 scrapes the food waste remaining on the rear surface of the storage body 41 to separate the food waste from the rear surface of the storage body 41 as the agitator 200 is rotated.

In addition, a pair of axial scrapers 216 is arranged at the top of the door 213, e.g. outward of the storage body 41, to extend in the longitudinal direction of the door 213. The axial scrapers 216 scrape the food waste remaining on the inner circumferential surface of the storage body 41 to separate the food waste from the inner circumferential surface of the storage body 41 as the agitator 200 is rotated. In addition, circumferential scrapers 215 are arranged respectively at the front and rear ends of the door 213 in the rotation direction of the agitator 200.

Figure 19:
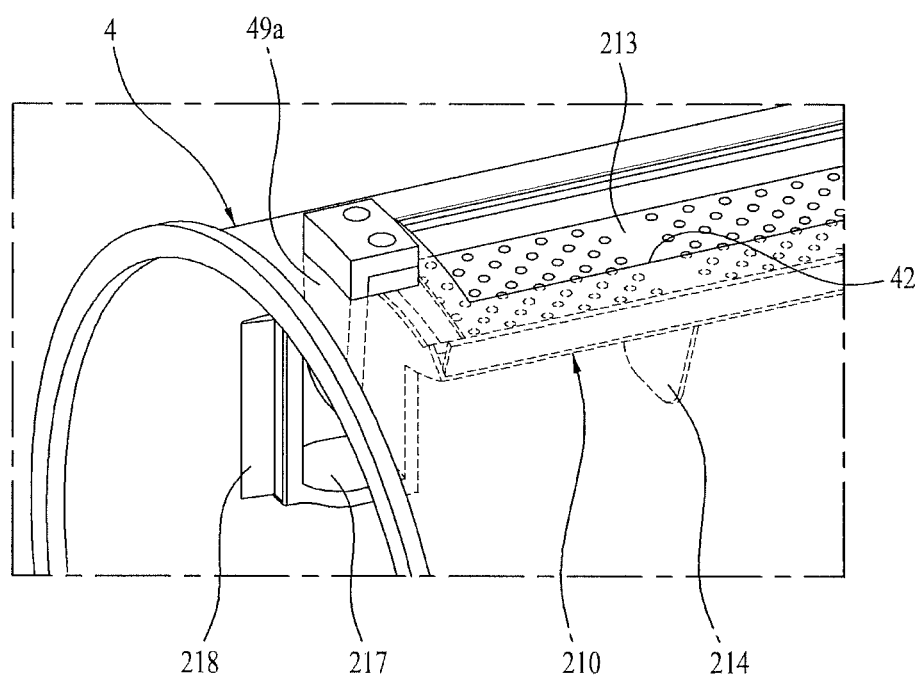
FIG. 19 is a perspective view of an example front cutter recess of a door blade of an agitator.

In addition, as illustrated in FIG. 19, the door 213 is provided at the front end thereof with a front cutter recess 217 that corresponds to the front cutters 49a formed inside the front end of the storage body 41. The front cutter recess 217 is shaped to intersect the front cutters 49a of the storage body 41 as the agitator 200 is rotated. Through intersection of the front cutter recess 217 and the respective front cutters 49a, the food waste inside the front end of the storage body 41 moved by the agitator 200 may be ground. In addition, a front scraper 218 is formed at the front side of the front cutter recess 217. The front scraper 218 scrapes the food waste on the inner surface of the front cover 41a defining the front of the storage body 41 to separate the food waste remaining on the inner surface of the front cover 41a.

Figure 20:
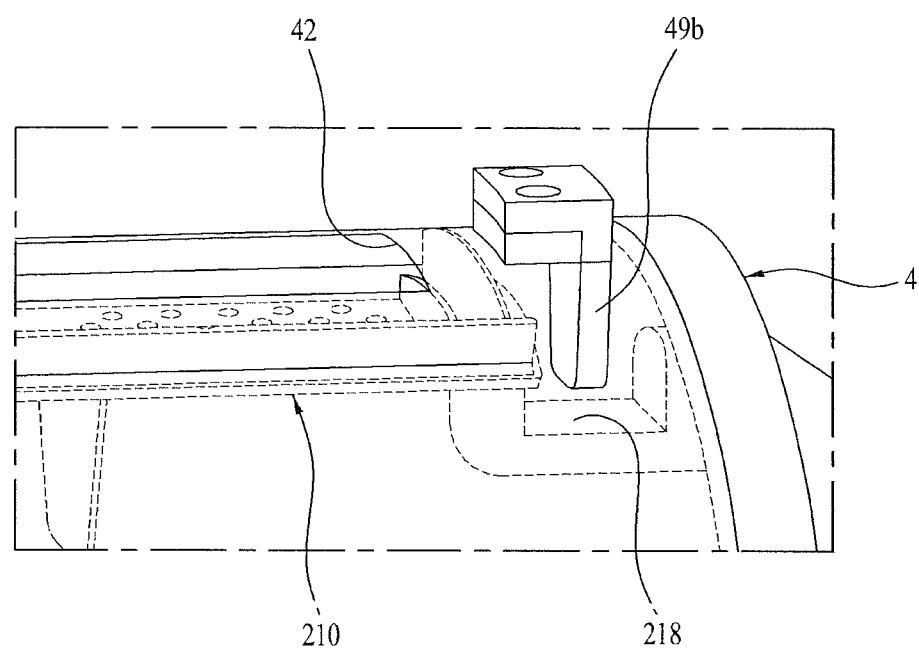
FIG. 20 is a perspective view of an example rear cutter recess of a door blade of an agitator.

Meanwhile, as illustrated in FIG. 20, a rear cutter recess 219 is formed between the door 213 and the connection bar 211. The rear cutter recess 219 corresponds to the rear cutters 49b formed inside the rear end of the storage body 41. The rear cutter recess 219 is shaped to intersect the rear cutters 49b of the storage body 41 as the agitator 200 is rotated. Through intersection of the rear cutter recess 219 and the respective rear cutters 49b, the food waste inside the rear end of the storage body 41 moved by the agitator 200 may be ground.

Here, although the rear cutter recess 219 has been described above as being formed in the door blade 210, e.g. between the connection bar 211 and the door 213, the rear cutter recess 219 may be formed between the connection bars 221 formed with the agitation blades 220.

Meanwhile, the rear scraper 212, the circumferential scrapers 215, the axial scrapers 216, and the front scraper 218 as described above may be formed of a rubber material having predetermined elasticity. In addition, the circumferential scrapers 215 and the axial scrapers 216 may serve to scrape the inner surface of the storage body 41 and may also serve prevent leakage of the food waste between the door 213 and the communication hole 42 when the door 213 closes the communication hole 42 of the storage body 41.

Figure 21:
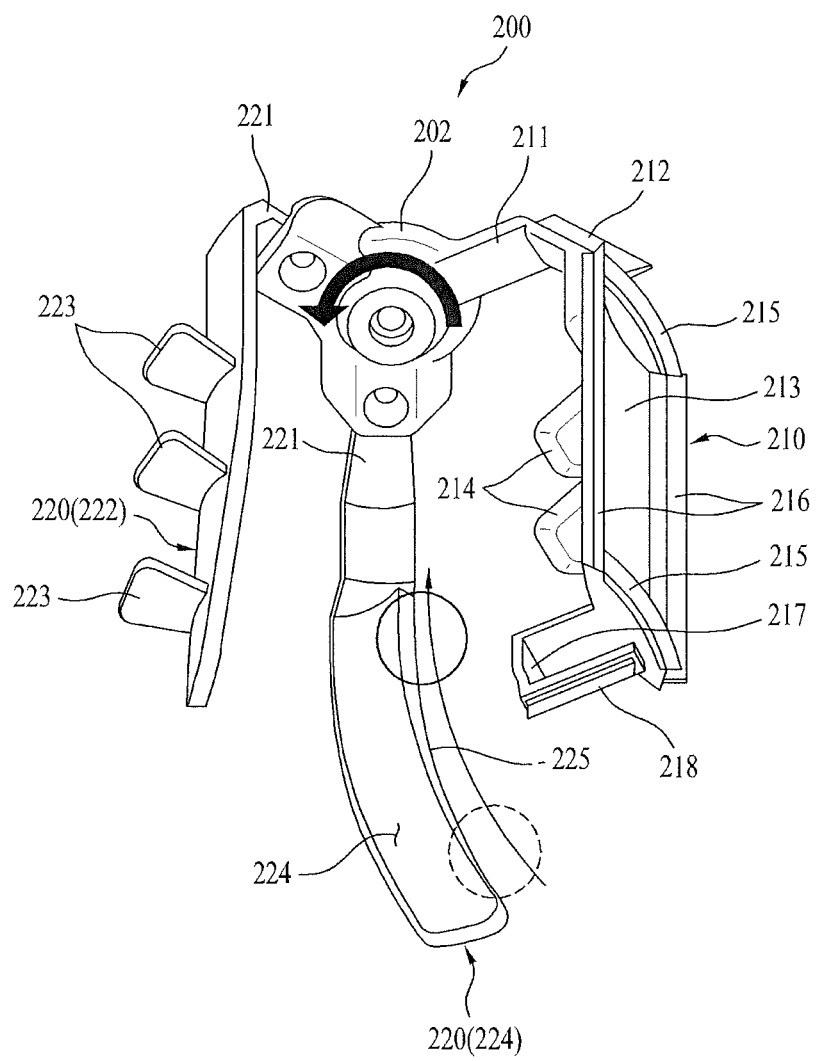
FIGS. 21 and 22 are perspective views of example operations of an agitator.
Figure 22:
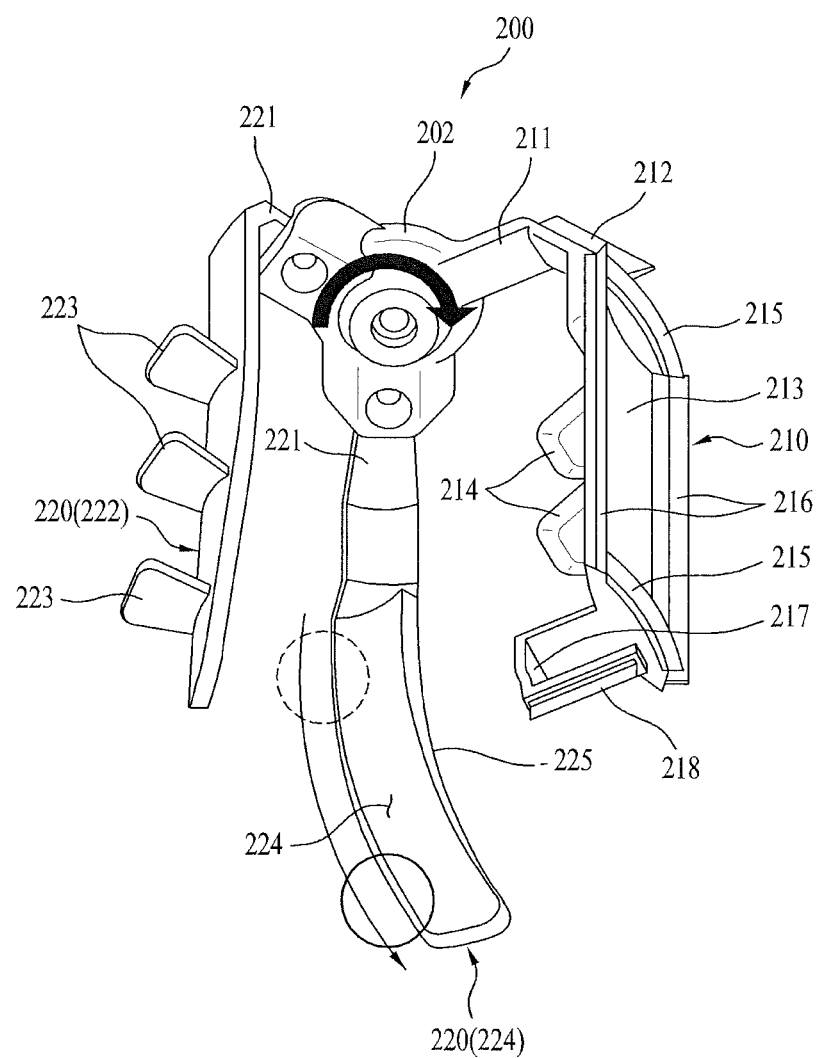

The agitation blades 220, as illustrated in FIGS. 21 and 22, include a spacer cutting blade 222 to grind relative large food waste stored in the storage body 41 and a scraping blade 224 to grind relatively small food waste located in proximity to the inner circumferential surface of the storage body 41.

Here, the spacer cutting blade 222 extends in the axial direction of the storage body 41 from the end of one of the connection bars 221 and is spaced apart from the inner circumferential surface of the storage body 41 by a predetermined distance. In addition, a plurality of outward cutters 223 is formed at the outer surface of the spacer cutting blade 222, e.g., facing outward of the storage body 41, so as to protrude toward the inner circumferential surface of the storage body 41. As such, during rotation of the agitator 200, relatively large food waste among the food waste stored in the storage body 41 may be ground by a body of the spacer cutting blade 222 and the outward cutters 223 formed at the spacer cutting blade 222.

The scraping blade 224 extends in the axial direction of the storage body 41 from the end of the other connection bar 221 and is located in proximity to the inner circumferential surface of the storage body 41. The scraping blade 224 has a curved portion 226 that is convexly curved with respect to a given rotation direction of the agitator 200. That is, the end of the scraping blade 224 extending from the connection bar 221 is inclined toward an opposite direction of the given rotation direction of the agitator 200. When the agitator 200 is rotated in the given rotation direction, the curved portion 226 of the scraping blade 224 moves the food waste stored in the storage body 41 forward of the storage body 41. When the agitator 200 is rotated in an opposite direction, the curved portion 226 of the scraping blade 224 moves the food waste stored in the storage body 41 rearward of the storage body 41.

In addition, the scraping blade 224 may have a slope 225, the cross section of which is inclined with respect to a given rotation direction of the agitator 200. That is, the slope 225 of the scraping blade 224 functions to scrape the food waste stored in the storage body 41 when the agitator 200 is rotated in a given direction and also functions to press and grind the food waste stored in the storage body 41 when the agitator 200 is rotated in an opposite direction.

The door blade 210, the spacer cutting blade 222, and the scraping blade 224 as described above may be spaced apart from one another by the same angle about the agitator rotating shaft 53. That is, in the case where the door blade 210, the spacer cutting blade 222, and the scraping blade 224 are provided, the door blade 210, the spacer cutting blade 222, and the scraping blade 224 are spaced apart from one another by 120 degrees about the agitator rotating shaft 53.

Figure 23:
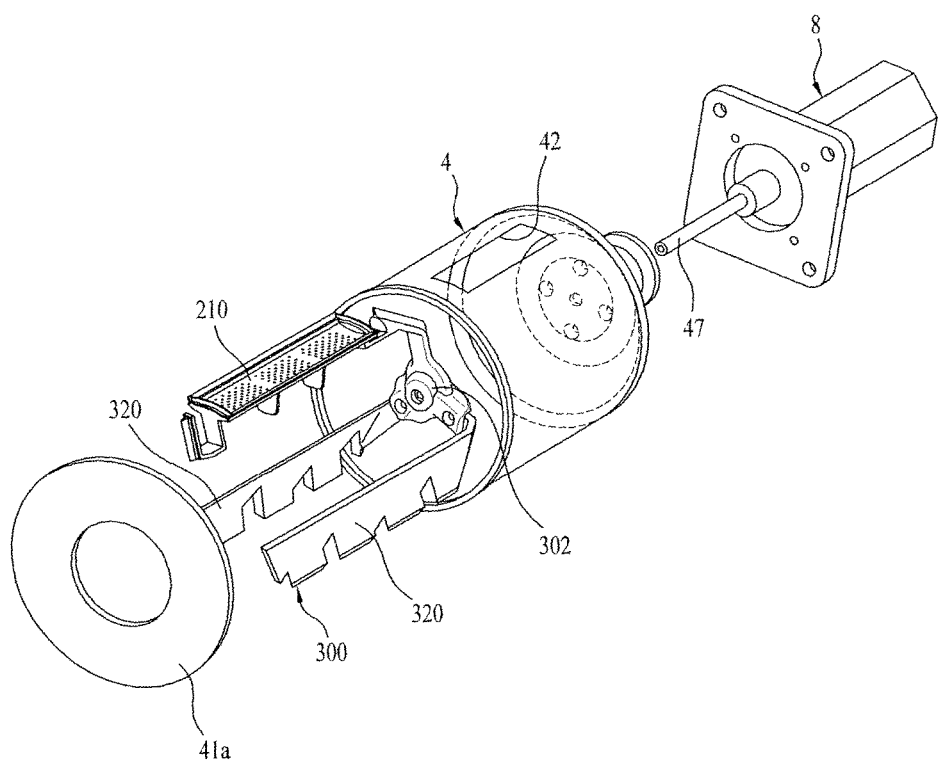
FIG. 23 is an exploded perspective view of an example dehydrator and agitator.
Figure 24:
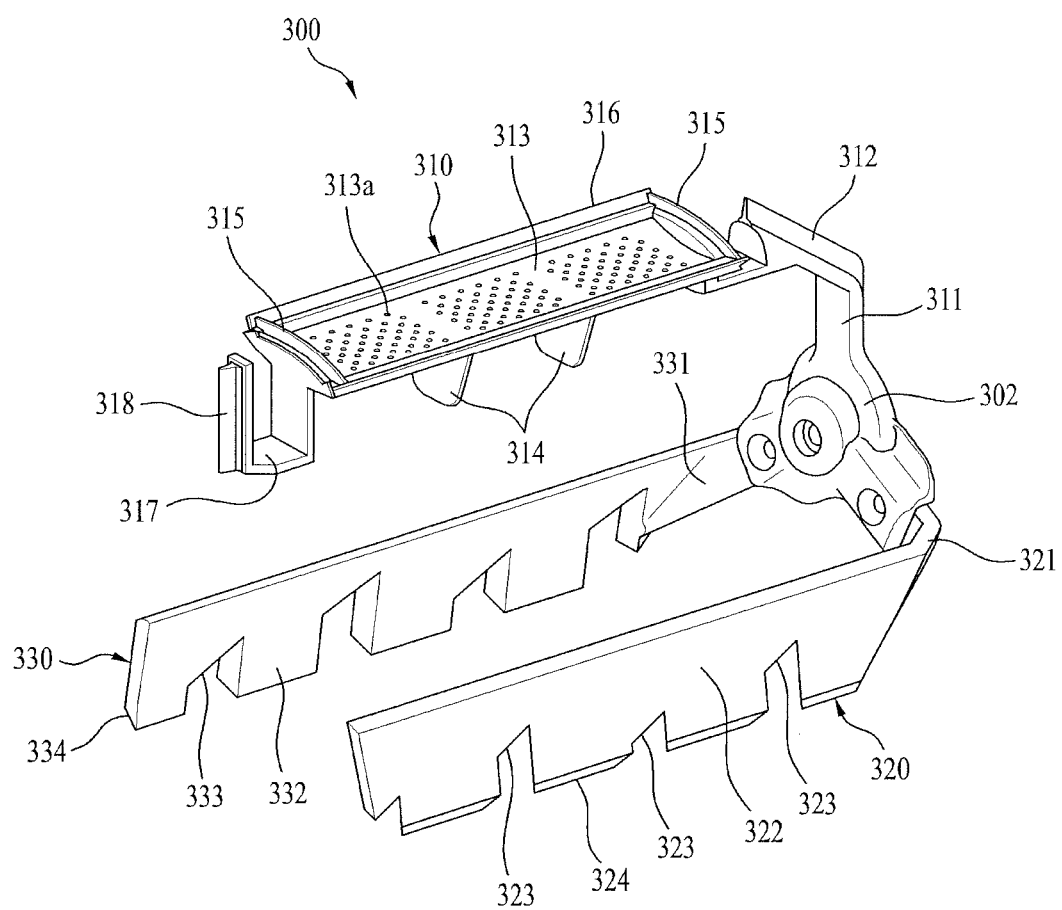
FIG. 24 is a perspective view of an example agitator.

Hereinafter, the dehydrator 4 and an agitator 300 will be described with reference to FIGS. 23 to 27. FIG. 23 illustrates an example dehydrator and agitator.

Here, the dehydrator according to the present implementations is similar to that of the above-described implementations and, thus, a detailed description thereof will be omitted herein. The dehydrator should be understood with reference to that of the above-described implementations.

The agitator 300 includes a base 302 that is located inside the storage body 41 of the dehydrator 4 and coupled to the agitator rotating shaft 53 passing through the shaft throughbore of the storage body 41, a plurality of connection bars 311, 321 and 331 that radially extends about the agitator rotating shaft 53 from the outer circumference of the base 302, a door blade 310 that is coupled to an end of a specific one of the connection bars 311 and serves to close the communication hole 42 of the storage body 41, and first and second agitation blades 320 and 330 that are respectively provided at the other connection bars 321 and 331 and serve to perform agitation, grinding and scraping of the food waste stored in the storage body 41.

Figure 25:
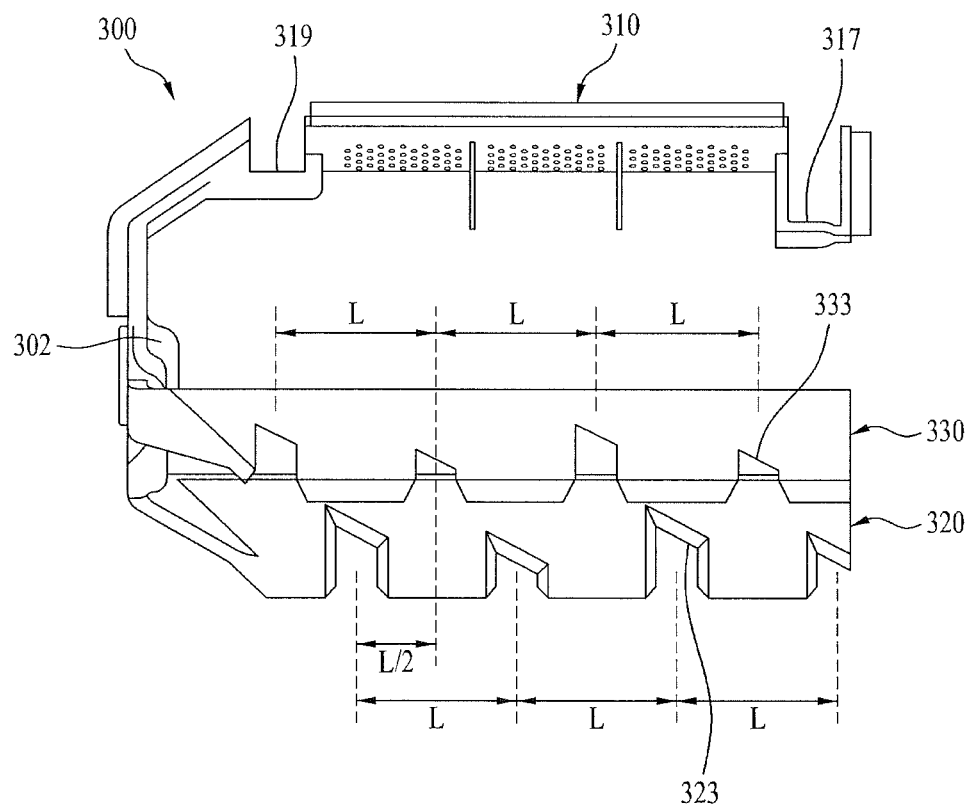
FIG. 25 is a side view of an example agitator.

The door blade 310, as illustrated in FIG. 25, includes a door 313 that extends from the end of the connection bar 311 in the rotation axis direction along the inner circumferential surface of the storage body 41 so as to have a shape corresponding to the communication hole 42 of the storage body 41. The door 313 has a plurality of through-holes 313a formed therein to assure discharge of water from the food waste stored in the dehydrator 4 during rotation of the dehydrator 4. A plurality of inward cutters 314 protrudes from the lower surface of the door 313, e.g. inward of the storage body 41, to grind the food waste stored in the storage body 41. Thereby, as the agitator 300 is rotated, some of the food waste stored in the storage body 41 that is relatively large in size and moved toward the center of the storage body 41 via rotation of the agitator 300 may be ground by the inward cutters 314 formed at the door blade 310.

Meanwhile, the connection bar 311 of the door blade 310 is provided with a rear scraper 312. The rear scraper 312 scrapes the food waste remaining on the rear surface of the storage body 41 as the agitator 300 is rotated, thereby separating the food waste from the rear surface of the storage body 41.

In addition, a pair of axial scrapers 316 is arranged at the top of the door 313, e.g. outward of the storage body 41, to extend in the longitudinal direction of the door 313. The axial scrapers 316 serve to scrape the food waste remaining on the inner circumferential surface of the storage body 41 as the agitator 300 is rotated, thereby separating the food waste from the inner circumferential surface of the storage body 41. In addition, circumferential scrapers 315 are arranged respectively at the front and rear ends of the door 313 in the rotation direction of the agitator 300.

In addition, the door 313 is provided at the front end thereof with a front cutter recess 317 that corresponds to the front cutters 49a formed inside the front end of the storage body 41. The front cutter recess 317 is shaped to intersect the front cutters 49a of the storage body 41 as the agitator 300 is rotated. Through intersection of the front cutter recess 317 and the respective front cutters 49a, the food waste inside the front end of the storage body 41 moved by the agitator 300 may be ground. In addition, a front scraper 318 is formed at the front side of the front cutter recess 317 and serves to scrape the food waste on the inner surface of the front cover 41a defining the front of the storage body 41 so as to separate the food waste remaining on the inner surface of the front cover 41a.

Meanwhile, a rear cutter recess 319 is formed between the door 313 and the connection bar 311 at a position corresponding to the rear cutters 49b formed inside the rear end of the storage body 41. The rear cutter recess 319 is shaped to intersect the rear cutters 49b of the storage body 41 as the agitator 300 is rotated. Through intersection of the rear cutter recess 319 and the respective rear cutters 49b, the food waste inside the rear end of the storage body 41 moved by the agitator 300 may be ground.

Here, although the rear cutter recess 319 has been described above as being formed in the door blade 310, e.g. between the connection bar 311 and the door 313, the rear cutter recess 319 may be formed between the respective connection bars 321 and 331 formed with the first and second agitation blades 320 and 330.

Meanwhile, the rear scraper 312, the circumferential scrapers 315, the axial scrapers 316, and the front scraper 318 as described above may be formed of a rubber material having predetermined elasticity. In addition, the circumferential scrapers 315 and the axial scrapers 316 may serve to scrape the inner surface of the storage body 41 and may also serve prevent leakage of the food waste between the door 313 and the communication hole 42 when the door 313 closes the communication hole 42 of the storage body 41.

Figure 26:
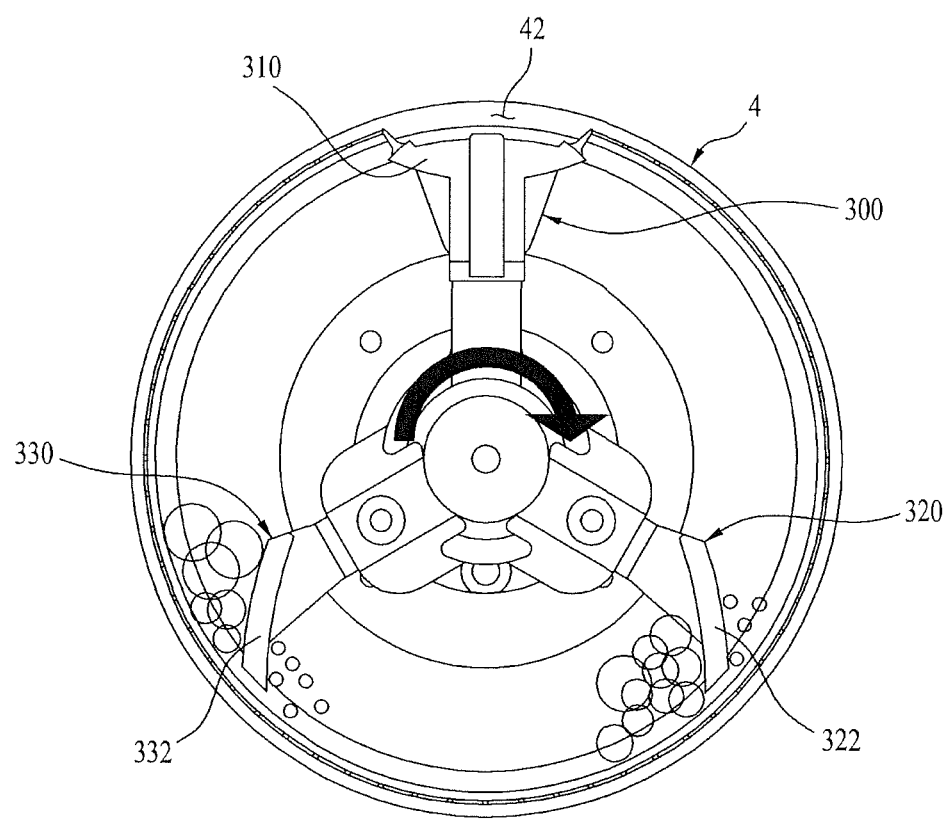
FIGS. 26 and 27 are front views of an example operation of an agitator.
Figure 27:
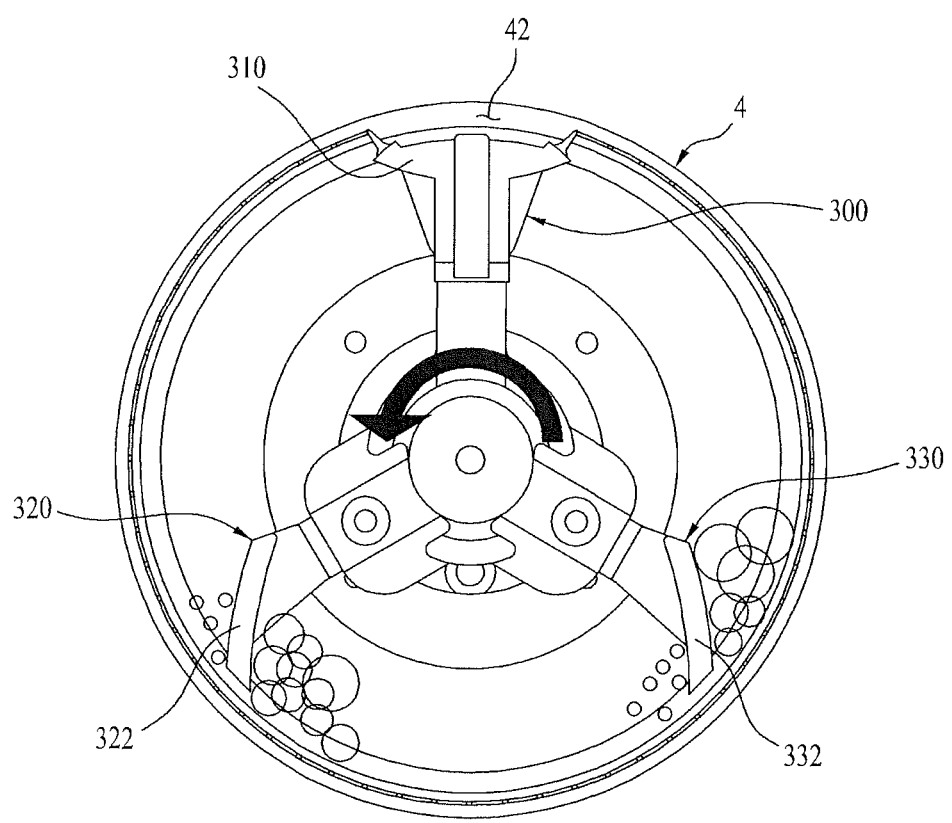

The first and second agitation blades 320 and 330, as illustrated in FIGS. 25 to 27, are symmetrically formed at the respective first and second connection bars 321 and 331 that extend from the base 302. That is, the first agitation blade 320 includes a first oblique blade 322 having a plate shape, the first oblique blade 322 being inclined toward a given rotation direction of the agitator 300 and having a predetermined length to allow the lower end thereof to be located in proximity to the inner circumferential surface of the storage body 41. The second agitation blade 330 includes a second oblique blade 332 having a plate shape, the second oblique blade 332 being inclined away toward the given rotation direction of the agitator 300 and having a predetermined length to allow the lower end thereof to be located in proximity to the inner circumferential surface of the storage body 41.

In addition, the first and second oblique blades 322 and 332 are provided at the lower ends thereof with first and second slopes 324 and 334 that are located in proximity to the inner circumferential surface of the storage body 41. Here, the first and second slopes 324 and 334 have symmetrical shapes such that they are located in proximity to the inner circumferential surface of the storage body 41.

The first oblique blade 322 has a plurality of first cutter recesses 323 and the second oblique blade 332 has a plurality of second cutter recesses 333. Here, each of the first and second cutter recesses 323 and 333 are spaced apart from one another by the same distance and the first cutter recesses 323 and the second cutter recesses 333 are alternately arranged. That is, the first and second cutter recesses 323 and 333 may be arranged at a distance L and a distance between a respective one of the first cutter recesses 323 and a neighboring one of the second cutter recesses 333 may be L/2. In addition, the first and second cutter recesses 323 and 333 may have different depths.

Meanwhile, the first agitation blade 320 and the second agitation blade 330 perform different functions based on the rotation direction of the agitator 300. As illustrated in FIG. 26, when the agitator 300 is rotated in a given direction, the first oblique blade 322 of the first agitation blade 320 functions to press and grind the food waste stored in the storage body 41 and the second oblique blade 332 of the second agitation blade 330 functions to scrape and separate the food waste stored in the storage body 41 from the inner circumferential surface of the storage body 41.

In addition, as illustrated in FIG. 27, when the agitator 300 is rotated in an opposite direction, the second oblique blade 332 of the second agitation blade 330 functions to press and grind the food waste stored in the storage body 41 and the first oblique blade 322 of the first agitation blade 320 functions to scrape and separate the food waste stored in the storage body 41 from the inner circumferential surface of the storage body 41.

In addition, the first and second cutter recesses 323 and 333 formed in the first and second oblique blades 322 and 332 are alternately arranged via rotation of the agitator 300 to assure uniform grinding of the food waste stored in the storage body 41.

As is apparent from the above description, a food waste treatment apparatus may be capable of grinding, dehydrating, and drying food waste.

In addition, a food waste treatment apparatus may have an effect of achieving uniform grinding effects regardless of the kind of food waste introduced.

What is claimed is:

1. A food waste treatment apparatus comprising:
   a housing that defines a space that is configured to dehydrate and dry food waste, the housing having an inlet port that is configured to receive the food waste and an outlet port that is configured to discharge the food waste that has been dehydrated and dried;
   a cylindrical dehydrator that is configured to remove water included in the food waste by spinning the food waste inside the housing, the cylindrical dehydrator having a communication hole that is configured to connect with the inlet port or the outlet port based on rotation of the cylindrical dehydrator;
   an agitator that is located in the cylindrical dehydrator, that is configured to rotate simultaneously with or independently of the dehydrator, that is configured to selectively open or close the communication hole, and that is configured to agitate and grind the food waste inside the cylindrical dehydrator based on rotation of the agitator; and
   a dryer that is configured to dry the food waste by supplying dry air to the housing.

2. The apparatus according to claim 1, further comprising a drive unit that is configured to rotate the agitator in a clockwise direction and a counterclockwise direction,
   wherein the cylindrical dehydrator rotates along with the agitator based on the agitator being rotated in one direction among the clockwise direction and the counterclockwise direction.

3. The apparatus according to claim 1, wherein the agitator includes:
   a base that is located inside the cylindrical dehydrator and is configured to rotate;
   a door blade extending from an outer circumferential surface of the base along the inside of the dehydrator, the door blade being configured to selectively open or close the communication hole and to agitate and grind the food waste inside a storage body of the cylindrical dehydrator based on rotation of the base; and
   an agitation blade that is spaced apart from the door blade by a predetermined distance, that extends along the inside of the storage body, and that is configured to agitate and grind the food waste in the storage body based on rotation of the base.

4. The apparatus according to claim 3, wherein the door blade includes:
   a connection bar that radially extends from the outer circumferential surface of the base; and
   a door that is located at an end of the connection bar at a position corresponding to the communication hole and that has a predetermined length.

5. The apparatus according to claim 4, wherein the connection bar includes a rear scraper that is located on an outer surface of the connection bar and that is configured to contact a rear inner surface of the cylindrical dehydrator.

6. The apparatus according to claim 4, wherein the door includes a plurality of inward cutters that are located at a lower surface of the door and are configured to grind the food waste located in a central region of the cylindrical dehydrator.

7. The apparatus according to claim 4, wherein the door includes circumferential scrapers that are located at both longitudinal ends of the door and are configured to contract an inner circumferential surface of the cylindrical dehydrator.

8. The apparatus according to claim 4, wherein the door includes axial scrapers that are located at both transverse ends of the door, that are configured to contact an inner circumferential surface of the cylindrical dehydrator, and that are configured to maintain air-tightness of the cylindrical dehydrator based on the door covering the communication hole.

9. The apparatus according to claim 4, wherein:
   the cylindrical dehydrator includes a plurality of fixed cutters that are located at inner circumferential surface of the cylindrical dehydrator, and
   the door defines a cutter recess that is located at an end of the door and configured to intersect the fixed cutters.

10. The apparatus according to claim 3, wherein the agitation blade includes:
    a connection bar that radially extends from the outer circumferential surface of the base; and
    a spacer cutter blade that extends from an end of the connection bar and is separated from an inner circumferential surface of the cylindrical dehydrator by a predetermined distance.

11. The apparatus according to claim 10, wherein the spacer cutter blade includes a plurality of outward cutters that are located at an outer surface of the spacer cutter blade and that are configured to grind the food waste located on the inner circumferential surface of the cylindrical dehydrator.

12. The apparatus according to claim 3, wherein the agitation blade includes:
    a connection bar that radially extends from the outer circumferential surface of the base; and
    a scraping blade that extends from an end of the connection bar and that is located in proximity to the inner circumferential surface of the cylindrical dehydrator.

13. The apparatus according to claim 12, wherein the scraping blade is a curved bar that protrudes in a rotation direction of the base and is located in proximity to an inner side surface of the cylindrical dehydrator.

14. The apparatus according to claim 12, wherein the scraping blade is configured to move the food waste forward along the cylindrical dehydrator based on the agitator rotating in a first rotation direction and configured to move the food waste rearward along the cylindrical dehydrator based on the agitator rotating in a second rotation direction that is opposite the first rotation direction.

15. The apparatus according to claim 12, wherein the scraping blade has a downwardly inclined cross section relative to a first rotation direction of the base and is located in proximity to an inner side surface of the cylindrical dehydrator.

16. The apparatus according to claim 12, wherein the scraping blade is located in proximity to an inner side surface of the cylindrical dehydrator and has a longitudinal edge in proximity to the inner circumferential surface of the cylindrical dehydrator and an opposite longitudinal edge separated from the inner circumferential surface of the cylindrical dehydrator.

17. The apparatus according to claim 12, wherein the scraping blade is configured to press and grind the food waste based on the agitator rotating in a first rotation direction and the scraping blade is configured to scrape and separate the food waste from the inner circumferential surface of the cylindrical dehydrator based on the agitator rotating in a second rotation direction that is opposite the first rotation direction.

18. The apparatus according to claim 3, wherein the agitation blade includes:
a first connection bar that radially extends from the outer circumferential surface of the base;
a first oblique blade that extends from an end of the first connection bar, that is located in proximity to an inner circumferential surface of the cylindrical dehydrator, and that is inclined toward a first rotation direction of the base;
a second connection bar that radially extends from the outer circumferential surface of the base and that is separated from the first connection bar; and
a second oblique blade that extends from an end of the second connection bar, that is located in proximity to the inner circumferential surface of the cylindrical dehydrator, and that is inclined toward a second rotation direction of the base that is opposite the first rotation direction.

19. The apparatus according to claim 18, wherein:
the first oblique blade includes a plurality of first cutter recesses that are each separated by a predetermined distance, and
the second oblique blade includes a plurality of second cutter recesses that are each separated from the respective first cutter recesses.

20. The apparatus according to claim 19, wherein each depth of each first cutter recess and each second cutter recess are different depths.

* * * * *